(12) United States Patent
Sun et al.

(10) Patent No.: US 12,069,571 B2
(45) Date of Patent: Aug. 20, 2024

(54) DUAL DISCONTINUOUS RECEPTION (DRX) IN FREQUENCY RANGE 1 (FR1) AND FREQUENCY RANGE 2 (FR2) CARRIER AGGREGATION (CA)

(71) Applicant: Apple Inc., Cupertino, CA (US)

(72) Inventors: Haitong Sun, Cupertino, CA (US); Jie Cui, San Jose, CA (US); Yang Tang, San Jose, CA (US); Dawei Zhang, Saratoga, CA (US); Zhibin Wu, Los Altos, CA (US); Fangli Xu, Beijing (CN); Hong He, San Jose, CA (US)

(73) Assignee: Apple Inc., Cupertino, CA (US)

( * ) Notice: Subject to any disclaimer, the term of this patent is extended or adjusted under 35 U.S.C. 154(b) by 53 days.

(21) Appl. No.: 17/267,855

(22) PCT Filed: Feb. 12, 2020

(86) PCT No.: PCT/CN2020/074900
§ 371 (c)(1),
(2) Date: Feb. 11, 2021

(87) PCT Pub. No.: WO2021/159315
PCT Pub. Date: Aug. 19, 2021

(65) Prior Publication Data
US 2022/0377662 A1 Nov. 24, 2022

(51) Int. Cl.
*H04W 52/02* (2009.01)
*H04W 24/10* (2009.01)
*H04W 76/28* (2018.01)

(52) U.S. Cl.
CPC ....... *H04W 52/0216* (2013.01); *H04W 24/10* (2013.01); *H04W 52/028* (2013.01); *H04W 76/28* (2018.02)

(58) Field of Classification Search
CPC ............. H04W 52/0216; H04W 24/10; H04W 52/028; H04W 76/28; H04W 8/22; H04W 52/0212; Y02D 30/70; H04L 5/001
See application file for complete search history.

(56) References Cited

U.S. PATENT DOCUMENTS 10,674,444 B2    6/2020   Zhou et al.
2011/0002281 A1  1/2011   Terry
(Continued)

FOREIGN PATENT DOCUMENTS

JP    2017017633 A    1/2017
WO    2018128855 A1   12/2018

OTHER PUBLICATIONS

3GPP TSG-RAN2 Meeting #108, "LS on Secondary DRX Group" Nov. 2019 p. 1 (Year: 2019).*
(Continued)

*Primary Examiner* — Ayanah S George
(74) *Attorney, Agent, or Firm* — Eschweiler & Potashnik, LLC

(57) ABSTRACT

Techniques discussed herein can facilitate configuration of a User Equipment (UE) with two or more Discontinuous Reception (DRX) configurations. A first set of techniques can facilitate configuration of the UE with independent DRX configurations for Frequency Range 1 (FR1) and for Frequency Range 2 (FR2). A second set of techniques can facilitate configuration of the UE with independent DRX configurations for a first set of one or more Component Carriers (CCs) associated with a first frequency band of a supported band combination and for a second set of one or more CCs associated with a second frequency band of the supported band combination. Various embodiments can employ techniques of one or more of the first set of techniques or the second set of techniques.

21 Claims, 12 Drawing Sheets

(56) References Cited

U.S. PATENT DOCUMENTS

| | | |
|---|---|---|
| 2015/0319753 A1 | 11/2015 | Chen |
| 2016/0081020 A1* | 3/2016 | Rahman ............... H04W 24/10 370/311 |
| 2017/0127305 A1 | 5/2017 | Der et al. |
| 2019/0069325 A1 | 2/2019 | Yerramalli et al. |
| 2020/0045768 A1 | 2/2020 | He et al. |

OTHER PUBLICATIONS

3GPP TSG-RAN WG2 #108 "Running CR for the introduction of SRVCC from 5G to 3G" (Year: 2019).*
International Search Report dated Nov. 17, 2020 for International Application No. PCT/CN2020/074900.
"Discussion on DRX in EN-DC." Source: CMCC. Agenda Item: 7.11.3.3.3. 3GPP TSG-RAN WG4 Meeting 389, Spokane, US, Nov. 12-16, 2018. R4-1814734.
"Response LS on Sl Rlm/Rlp"; 3GPP TSG-RAN WG2 Meeting #108; R2-1916621; SA WG2 Meeting #S2-136AH; Jan. 13-17, 2020; p. 1.
Technical Specification; "Technical Specification Group Radio Access Network"; NR; Medium Access Control (MAC) Protocol Specification (Release 15); 3GPP TS 38.321; V15.8.0; Dec. 2019; p. 1-78.
Technical Specification; "Technical Specification Group Radio Access Network; NR; Requirements for Support of Radio Resource Management" (Release 15); 3GPP TS 38.133; V15.8.0; Dec. 2019; p. 1-16.
Martin van der Zee; "LS on Secondary DRX Group"; 3GPP RAN WG4; 3GPP TSG-RAN2 Meeting #108; R2-1916597; Nov. 18-22, 2019; pp. 1-2.
Apple; "On Secondary DRX Group for FR1+FR2 CA"; 3GPP TSG-RAN4 Meeting #94-e; R4-2000781; Feb. 24-Mar. 6, 2020; pp. 1-4.
3rd Generation Partnership Project; Technical Specification Group Radio Access Network; NR; Requirements for support of radio resource management (Release 15); 3GPP TS 38.133 V15.8.0; Dec. 2019; p. 1-16.
3rd Generation Partnership Project; Technical Specification Group Radio Access Network; NR; Requirements for support of radio resource management (Release 15); 3GPP TS 38.133 V15.8.0; Dec. 2019; p. 16-194.
3rd Generation Partnership Project; Technical Specification Group Radio Access Network; NR; Requirements for support of radio resource management (Release 15); 3GPP TS 38.133 V15.8.0; Dec. 2019; p. 192-605.
3rd Generation Partnership Project; Technical Specification Group Radio Access Network; NR; Requirements for support of radio resource management (Release 15); 3GPP TS 38.133 V15.8.0; Dec. 2019; p. 589-1067.
3rd Generation Partnership Project; Technical Specification Group Radio Access Network; NR; Requirements for support of radio resource management (Release 15); 3GPP TS 38.133 V15.8.0; Dec. 2019; p. 1030-1047.
3rd Generation Partnership Project; Technical Specification Group Radio Access Network; NR; Requirements for support of radio resource management; (Release 16); 3GPP TS 38.133 V16.2.0; Dec. 2019; p. 1-16.
3rd Generation Partnership Project; Technical Specification Group Radio Access Network; NR; Requirements for support of radio resource management; (Release 16); 3GPP TS 38.133 V16.2.0; Dec. 2019; p. 16-211.
3rd Generation Partnership Project; Technical Specification Group Radio Access Network; NR; Requirements for support of radio resource management; (Release 16); 3GPP TS 38.133 V16.2.0; Dec. 2019; p. 192-606.
3rd Generation Partnership Project; Technical Specification Group Radio Access Network; NR; Requirements for support of radio resource management; (Release 16); 3GPP TS 38.133 V16.2.0; Dec. 2019; p. 590-1073.
3rd Generation Partnership Project; Technical Specification Group Radio Access Network; NR; Requirements for support of radio resource management; (Release 16); 3GPP TS 38.133 V16.2.0; Dec. 2019; p. 1032-1049.
3rd Generation Partnership Project; Technical Specification Group Radio Access Network; NR; Medium Access Control (MAC) protocol specification; (Release 15); 3GPP TS 38.321 V15.8.0; Dec. 2019.
Response LS on SL RLM/RLF; 3GPP TSG-RAN WG2 Meeting #108; R2-1916621; Nov. 18, 2019.
5G; NR; Requirements for support of radio resource management; (3GPP TS 38.133 version 15.8.0 Release 15); ETSI TS 138 133 V15.8.0; Feb. 2020.
5G; NR; Medium Access Control (MAC) protocol specification; (3GPP TS 38.321 version 15.8.0 Release 15); ETSI TS 138 321 V15.8.0; Jan. 2020.
Japanese Office Action, Mailed Date: Jul. 18, 2023, in connection with Japanese Patent Application No. 2022-549053.
ZTE Corporation, Sanechips; Discussion on the configuration of measurement gap; 10.4.1.4.4, Discussion and Decision; R2-1712602; 3GPP TSG-RAN WG2 Meeting #100, Reno, USA, Nov. 27-Dec. 1, 2017.
Change Request; Running CR for the introduction of SRVCC from 5G to 3G; 3GPP TSG-RAN WG2 #108; R2-1916334; Nov. 18, 2019.
European Extended Search Report dated May 11, 2023 in connection with Application Serial No. EP20918942.
Nokia, Nokia Shanghai Bell; "Discussion on SFTD measurement between NR PSCell and NR neighbor cells in EN-DC"; 3GPP TSG-RAN WG2 Meeting #107bis; R2-1913782; Oct. 14, 2019.
China Unicom, Huawei, HiSilicon; Running CR for the introduction of SRVCC from 5G to 3G; 3GPP TSG-RAN WG2 #108; R2-1916334; Nov. 18, 2019.

* cited by examiner

DUAL DISCONTINUOUS RECEPTION (DRX) IN FREQUENCY RANGE 1 (FR1) AND FREQUENCY RANGE 2 (FR2) CARRIER AGGREGATION (CA)

This application is a National Phase entry application of International Patent Application No. PCT/CN2020/074900 filed Feb. 12, 2020 and is hereby incorporated by reference in its entirety.

FIELD

The present disclosure relates to wireless technology, and more specifically to techniques related to configuring a User Equipment (UE) with two or more Discontinuous Reception configurations for operation in one or more of Frequency Range 1 (FR1) or Frequency Range 2 (FR2).

BACKGROUND

The Third Generation Partnership Project (3GPP) Fifth Generation (5G) New Radio (NR) Radio Access Technology (RAT) is a newly developed air interface for 5G. 5G NR uses frequency bands in two distinct frequency ranges: Frequency Range 1 (FR1) comprising sub-6 GHz frequency bands, and Frequency Range 2 (FR2) comprising frequency bands above 6 GHz (e.g., comprising millimeter wave (mmWave), including frequency bands at 24 GHz and above).

While FR1 overlaps with and/or shares some frequency bands employed in other RATs (e.g., Fourth Generation (4G) Long Term Evolution (LTE) bands), FR2 is a unique design feature of 5G NR, which provides multiple advantages, but also presents challenges, such that operation on FR2 is significantly different than operation on FR1. FR2 allows UEs to access a much higher bandwidth, which can be advantageous for services that benefit from a high data rate and/or low latency. However, FR2 suffers from increased pathloss compared to lower frequencies. Additionally, FR2 operation can involve increased power consumption and thermal issues. Increased power consumption can result from baseband processing, transmission, and even AP load, due to the higher data rate possible via FR2.

DETAILED DESCRIPTION

Figure 1:
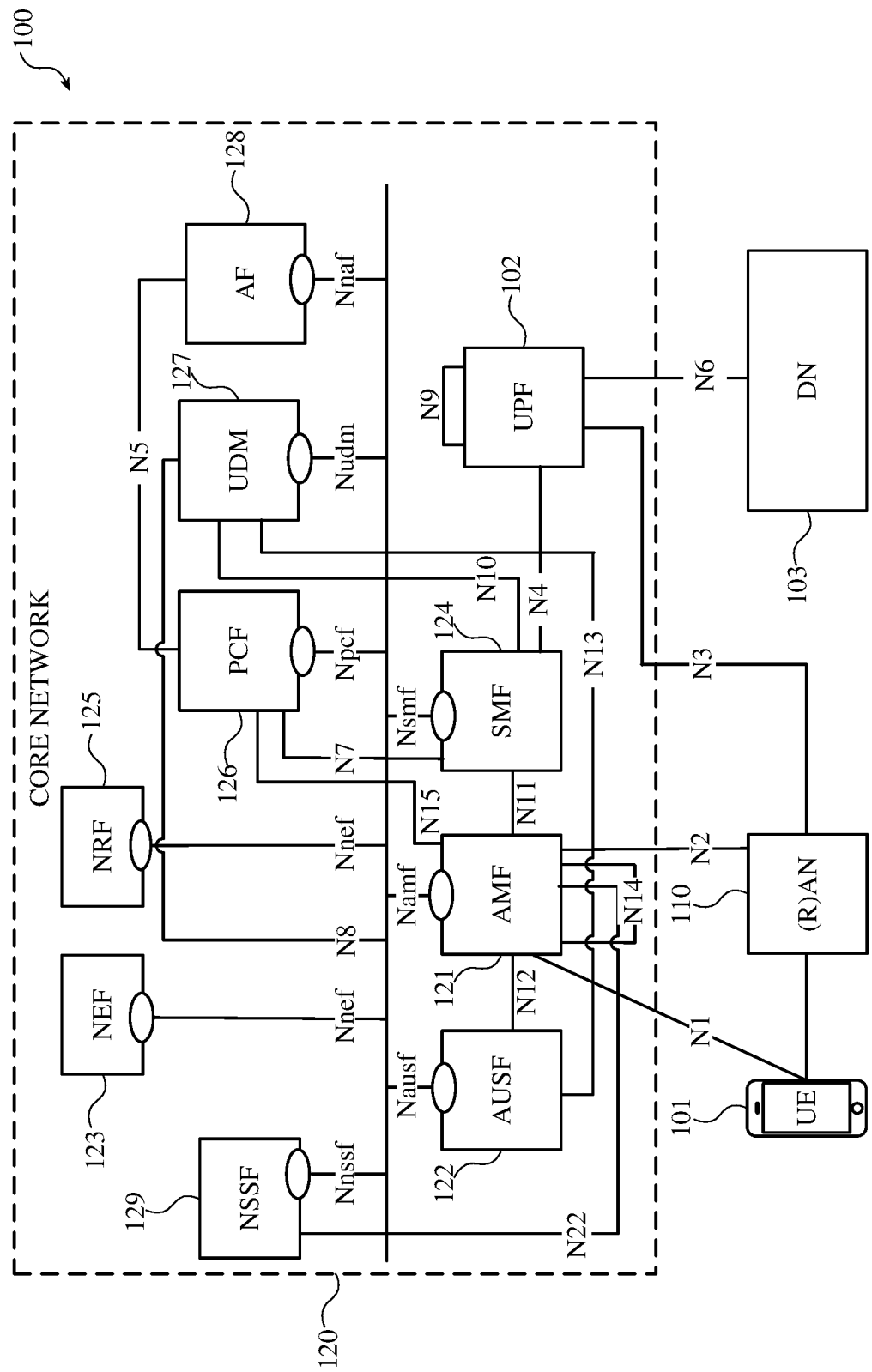
FIG. 1 is a block diagram illustrating an architecture of a system including a Core Network (CN), for example a Fifth Generation (5G) CN (5GC), in accordance with various embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone or other device configured to communicate via a 3GPP RAN, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more," unless the context indicates otherwise (e.g., "the empty set," "a set of two or more Xs," etc.).

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

Various aspects discussed herein can relate to facilitating wireless communication, and the nature of these communications can vary.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments described herein can be implemented into a system using any suitably configured hardware and/or software. FIG. 1 illustrates an architecture of a system 100 including a Core Network (CN) 120, for example a Fifth Generation (5G) CN (5GC), in accordance with various embodiments. The system 100 is shown to include a UE 101, which can be the same or similar to one or more other UEs discussed herein; a Third Generation Partnership Project (3GPP) Radio Access Network (Radio AN or RAN) or other (e.g., non-3GPP) AN, (R)AN 210, which can include one or more RAN nodes (e.g., Evolved Node B(s) (eNB(s)), next generation Node B(s) (gNB(s), and/or other nodes) or other nodes or access points; and a Data Network (DN) 203, which can be, for example, operator services, Internet access or third party services; and a Fifth Generation Core Network (5GC) 120. The 5GC 120 can comprise one or more of the following functions and network components: an Authentication Server Function (AUSF) 122; an Access and Mobility Management Function (AMF) 121; a Session Management Function (SMF) 124; a Network Exposure Function (NEF) 123; a Policy Control Function (PCF) 126; a Network Repository Function (NRF) 125; a Unified Data Management (UDM) 127; an Application Function (AF) 128; a User Plane (UP) Function (UPF) 102; and a Network Slice Selection Function (NSSF) 129.

The UPF 102 can act as an anchor point for intra-RAT and inter-RAT mobility, an external Protocol Data Unit (PDU) session point of interconnect to DN 103, and a branching point to support multi-homed PDU session. The UPF 102 can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 102 can include an uplink classifier to support routing traffic flows to a data network. The DN 103 can represent various network operator services, Internet access, or third-party services. DN 103 can include, or be similar to, an application server. The UPF 102 can interact with the SMF 124 via an N4 reference point between the SMF 124 and the UPF 102.

The AUSF 122 can store data for authentication of UE 101 and handle authentication-related functionality. The AUSF 122 can facilitate a common authentication framework for various access types. The AUSF 122 can communicate with the AMF 121 via an N12 reference point between the AMF 121 and the AUSF 122; and can communicate with the UDM 127 via an N13 reference point between the UDM 127 and the AUSF 122. Additionally, the AUSF 122 can exhibit an Nausf service-based interface.

The AMF 121 can be responsible for registration management (e.g., for registering UE 101, etc.), connection management, reachability management, mobility management, and lawful interception of AMF-related events, and access authentication and authorization. The AMF 121 can be a termination point for the an N11 reference point between the AMF 121 and the SMF 124. The AMF 121 can provide transport for SM messages between the UE 101 and the SMF 124, and act as a transparent proxy for routing SM messages. AMF 121 can also provide transport for SMS messages between UE 101 and a Short Message Service (SMS) Function (SMSF) (not shown in FIG. 1). AMF 121 can act as SEcurity Anchor Function (SEAF), which can include interaction with the AUSF 122 and the UE 101 and/or receipt of an intermediate key that was established as a result of the UE 101 authentication process. Where Universal Subscriber Identity Module (USIM) based authentication is used, the AMF 121 can retrieve the security material from the AUSF 122. AMF 121 can also include a Single-Connection Mode (SCM) function, which receives a key from the SEA that it uses to derive access-network specific keys. Furthermore, AMF 121 can be a termination point of a RAN Control Plane (CP) interface, which can include or be an N2 reference point between the (R)AN 110 and the AMF 121; and the AMF 121 can be a termination point of Non Access Stratum (NAS) (N1) signaling, and perform NAS ciphering and integrity protection.

AMF 121 can also support NAS signaling with a UE 101 over an Non-3GPP (N3) Inter Working Function (IWF) interface. The N3IWF can be used to provide access to untrusted entities. N3IWF can be a termination point for the N2 interface between the (R)AN 110 and the AMF 121 for the control plane, and can be a termination point for the N3 reference point between the (R)AN 110 and the UPF 102 for the user plane. As such, the AMF 121 can handle N2 signaling from the SMF 124 and the AMF 121 for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 101 and AMF 121 via an N1 reference point between the UE 101 and the AMF 121, and relay uplink and downlink user-plane packets between the UE 101 and UPF 102. The N3IWF also provides mechanisms for IPsec tunnel establishment with the UE 101. The AMF 121 can exhibit an Namf service-based interface, and can be a termination point for an N14 reference point between two AMFs 121 and an N17 reference point between the AMF 121 and a 5G Equipment Identity Register (5G-EIR) (not shown in FIG. 1).

The UE 101 can be registered with the AMF 121 in order to receive network services. Registration Management (RM) is used to register or deregister the UE 101 with the network (e.g., AMF 121), and establish a UE context in the network (e.g., AMF 121). The UE 101 can operate in an RM-REGISTERED state or an RM-DEREGISTERED state. In the RM-DEREGISTERED state, the UE 101 is not registered with the network, and the UE context in AMF 121 holds no valid location or routing information for the UE 101 so the UE 101 is not reachable by the AMF 121. In the RM-REGISTERED state, the UE 101 is registered with the network, and the UE context in AMF 121 can hold a valid location or routing information for the UE 101 so the UE 101 is reachable by the AMF 121. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

The AMF 121 can store one or more RM contexts for the UE 101, where each RM context is associated with a specific access to the network. The RM context can be a data structure, database object, etc. that indicates or stores, inter alia, a registration state per access type and the periodic update timer. The AMF 121 can also store a 5GC Mobility Management (MM) context that can be the same or similar to an (Enhanced Packet System (EPS))MM ((E)MM) context. In various embodiments, the AMF 121 can store a Coverage Enhancement (CE) mode B Restriction parameter of the UE 101 in an associated MM context or RM context. The AMF 121 can also derive the value, when needed, from the UE's usage setting parameter already stored in the UE context (and/or MM/RM context).

Connection Management (CM) can be used to establish and release a signaling connection between the UE 101 and the AMF 121 over the N1 interface. The signaling connection is used to enable NAS signaling exchange between the UE 101 and the CN 120, and comprises both the signaling connection between the UE and the AN (e.g., RRC connection or UE-N3IWF connection for non-3GPP access) and the N2 connection for the UE 101 between the AN (e.g., RAN 110) and the AMF 121. The UE 101 can operate in one of two CM states, CM-IDLE mode or CM-CONNECTED mode. When the UE 101 is operating in the CM-IDLE state/mode, the UE 101 may have no NAS signaling connection established with the AMF 121 over the N1 interface, and there can be (R)AN 110 signaling connection (e.g., N2 and/or N3 connections) for the UE 101. When the UE 101 is operating in the CM-CONNECTED state/mode, the UE 101 can have an established NAS signaling connection with the AMF 121 over the N1 interface, and there can be a (R)AN 110 signaling connection (e.g., N2 and/or N3 connections) for the UE 101. Establishment of an N2 connection between the (R)AN 110 and the AMF 121 can cause the UE 101 to transition from CM-IDLE mode to CM-CONNECTED mode, and the UE 101 can transition from the CM-CONNECTED mode to the CM-IDLE mode when N2 signaling between the (R)AN 110 and the AMF 121 is released.

The SMF 124 can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 101 and a data network (DN) 103 identified by a Data Network Name (DNN). PDU sessions can be established upon UE 101 request, modified upon UE 101 and 5GC 120 request, and released upon UE 101 and 5GC 120 request using NAS SM signaling exchanged over the N1 reference point between the UE 101 and the SMF 124. Upon request from an application server, the 5GC 120 can trigger a specific application in the UE 101. In response to receipt of the trigger message, the UE 101 can pass the trigger message (or relevant parts/information of the trigger message) to one or more identified applications in the UE 101. The identified application(s) in the UE 101 can establish a PDU session to a specific DNN. The SMF 124 can check whether the UE 101 requests are compliant with user subscription information associated with the UE 101. In this regard, the SMF 124 can retrieve and/or request to receive update notifications on SMF 124 level subscription data from the UDM 127.

The SMF 124 can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 124 can be included in the system 100, which can be between another SMF 124 in a visited network and the SMF 124 in the home network in roaming scenarios. Additionally, the SMF 124 can exhibit the Nsmf service-based interface.

The NEF 123 can provide means for securely exposing the services and capabilities provided by 3GPP network functions for third party, internal exposure/re-exposure, Application Functions (e.g., AF 128), edge computing or fog computing systems, etc. In such embodiments, the NEF 123 can authenticate, authorize, and/or throttle the AFs. NEF 123 can also translate information exchanged with the AF 128 and information exchanged with internal network functions. For example, the NEF 123 can translate between an AF-Service-Identifier and an internal 5GC information. NEF 123 can also receive information from other network functions (NFs) based on exposed capabilities of other network functions. This information can be stored at the NEF 123 as structured data, or at a data storage NF using standardized interfaces. The stored information can then be re-exposed by the NEF 123 to other NFs and AFs, and/or used for other purposes such as analytics. Additionally, the NEF 123 can exhibit an Nnef service-based interface.

The NRF 125 can support service discovery functions, receive NF discovery requests from NF instances, and provide the information of the discovered NF instances to the NF instances. NRF 125 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 125 can exhibit the Nnrf service-based interface.

The PCF 126 can provide policy rules to control plane function(s) to enforce them, and can also support unified policy framework to govern network behavior. The PCF 126 can also implement an FE to access subscription information relevant for policy decisions in a UDR of the UDM 127. The PCF 126 can communicate with the AMF 121 via an N15 reference point between the PCF 126 and the AMF 121, which can include a PCF 126 in a visited network and the AMF 121 in case of roaming scenarios. The PCF 126 can communicate with the AF 128 via an N5 reference point between the PCF 126 and the AF 128; and with the SMF 124 via an N7 reference point between the PCF 126 and the SMF 124. The system 100 and/or CN 120 can also include an N24 reference point between the PCF 126 (in the home network) and a PCF 126 in a visited network. Additionally, the PCF 126 can exhibit an Npcf service-based interface.

The UDM 127 can handle subscription-related information to support the network entities' handling of communication sessions, and can store subscription data of UE 101. For example, subscription data can be communicated between the UDM 127 and the AMF 121 via an N8 reference point between the UDM 127 and the AMF. The UDM 127 can include two parts, an application Functional Entity (FE) and a Unified Data Repository (UDR) (the FE and UDR are not shown in FIG. 1). The UDR can store subscription data and policy data for the UDM 127 and the PCF 126, and/or structured data for exposure and application data (including Packet Flow Descriptions (PFDs) for application detection, application request information for multiple UEs 101) for the NEF 123. The Nudr service-based interface can be exhibited by the UDR 221 to allow the UDM 127, PCF 126, and NEF 123 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different FEs can serve the same user in different transactions. The UDM-FE accesses subscription information stored in the UDR and performs authentication credential processing, user identification handling, access authorization, registration/mobility management, and subscription management. The UDR can interact with the SMF 124 via an N10 reference point between the UDM 127 and the SMF 124. UDM 127 can also support SMS management, wherein an SMS-FE implements similar application logic as discussed elsewhere herein. Additionally, the UDM 127 can exhibit the Nudm service-based interface.

The AF 128 can provide application influence on traffic routing, provide access to NEF 123, and interact with the policy framework for policy control. 5GC 120 and AF 128 can provide information to each other via NEF 123, which can be used for edge computing implementations. In such implementations, the network operator and third party services can be hosted close to the UE 101 access point of attachment to achieve an efficient service delivery through the reduced end-to-end latency and load on the transport network. For edge computing implementations, the 5GC can select a UPF 102 close to the UE 101 and execute traffic steering from the UPF 102 to DN 103 via the N6 interface. This can be based on the UE subscription data, UE location, and information provided by the AF 128. In this way, the AF 128 can influence UPF (re)selection and traffic routing. Based on operator deployment, when AF 128 is considered to be a trusted entity, the network operator can permit AF 128 to interact directly with relevant NFs. Additionally, the AF 128 can exhibit an Naf service-based interface.

The NSSF 129 can select a set of network slice instances serving the UE 101. The NSSF 129 can also determine allowed Network Slice Selection Assistance Information (NSSAI) and the mapping to the subscribed Single NSSAIs (S-NSSAIs), as appropriate. The NSSF 129 can also determine the AMF set to be used to serve the UE 101, or a list of candidate AMF(s) 121 based on a suitable configuration and possibly by querying the NRF 125. The selection of a set of network slice instances for the UE 101 can be triggered by the AMF 121 with which the UE 101 is registered by interacting with the NSSF 129, which can lead to a change of AMF 121. The NSSF 129 can interact with the AMF 121 via an N22 reference point between AMF 121 and NSSF 129; and can communicate with another NSSF 129 in a visited network via an N31 reference point (not shown in FIG. 1). Additionally, the NSSF 129 can exhibit an Nnssf service-based interface.

As discussed previously, the CN 120 can include an SMSF, which can be responsible for SMS subscription checking and verification, and relaying SM messages to/from the UE 101 to/from other entities, such as an SMS-Gateway Mobile services Switching Center (GMSC)/Inter-Working MSC (IWMSC)/SMS-router. The SMSF can also interact with AMF 121 and UDM 127 for a notification procedure that the UE 101 is available for SMS transfer (e.g., set a UE not reachable flag, and notifying UDM 127 when UE 101 is available for SMS).

The CN 120 can also include other elements that are not shown in FIG. 1, such as a Data Storage system/architecture, a 5G-EIR, a Security Edge Protection Proxy (SEPP), and the like. The Data Storage system can include a Structured Data Storage Function (SDSF), an Unstructured Data Storage Function (UDSF), and/or the like. Any NF can store and retrieve unstructured data into/from the UDSF (e.g., UE contexts), via N18 reference point between any NF and the UDSF (not shown in FIG. 1). Individual NFs can share a UDSF for storing their respective unstructured data or individual NFs can each have their own UDSF located at or near the individual NFs. Additionally, the UDSF can exhibit an Nudsf service-based interface (not shown in FIG. 1). The 5G-EIR can be an NF that checks the status of Permanent Equipment Identifier (PEI) for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 1 for clarity. In one example, the CN 120 can include an Nx interface, which is an inter-CN interface between the MME (e.g., a non-5G MME) and the AMF 121 in order to enable interworking between CN 120 and a non-5G CN. Other example interfaces/reference points can include an N5g-EIR service-based interface exhibited by a 5G-EIR, an N27 reference point between the Network Repository Function (NRF) in the visited network and the NRF in the home network; and an N31 reference point between the NSSF in the visited network and the NSSF in the home network.

Figure 2:
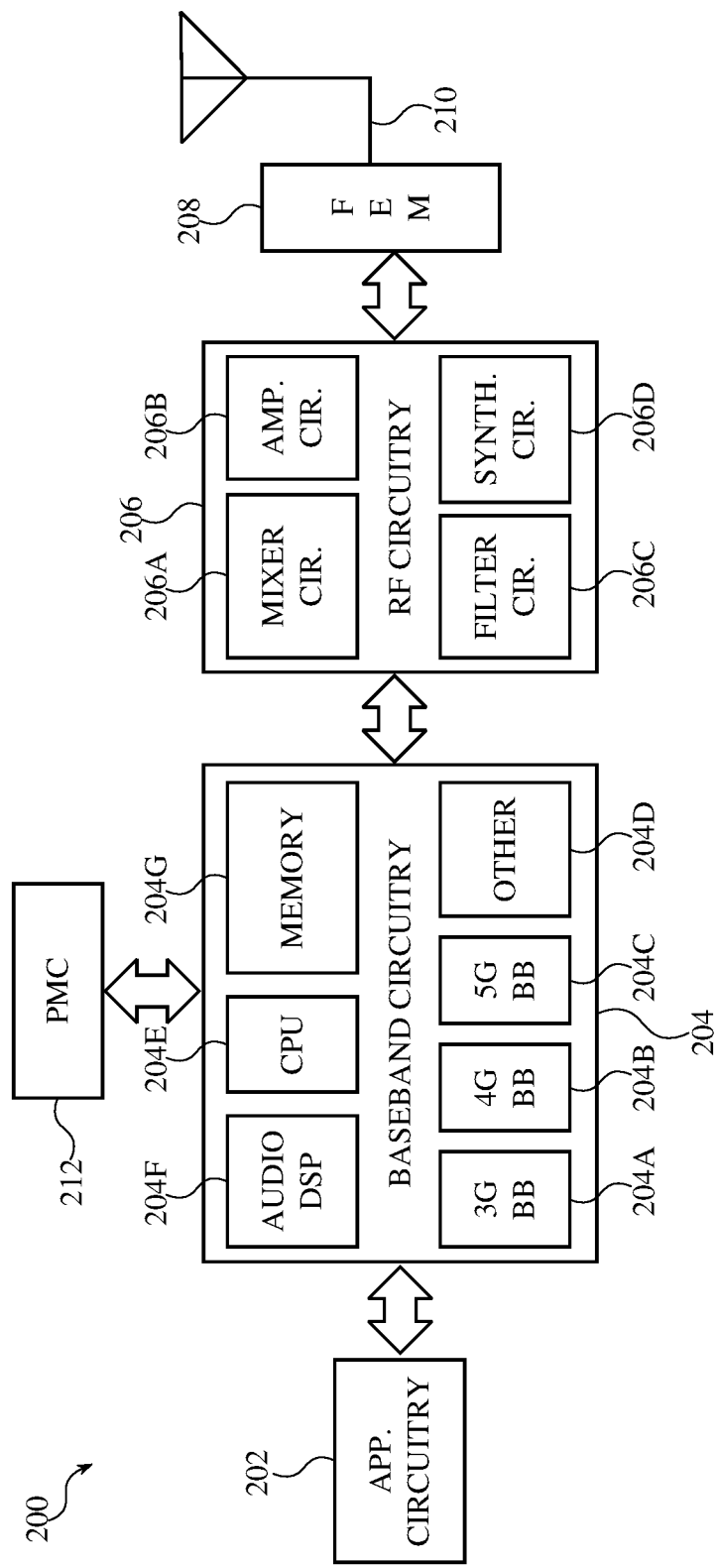
FIG. 2 is a diagram illustrating example components of a device that can be employed in accordance with various aspects discussed herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some embodiments, the device 200 can include fewer elements (e.g., a RAN node may not utilize application circuitry 202, and instead include a processor/controller to process IP data received from a CN such as 5GC 120 or an Evolved Packet Core (EPC)). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tailbiting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with a NG-RAN, an evolved universal terrestrial radio access network (EUTRAN) or other wireless metropolitan area networks (WMAN), a wireless local area network (WLAN), a wireless personal area network (WPAN), etc. Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc.

to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
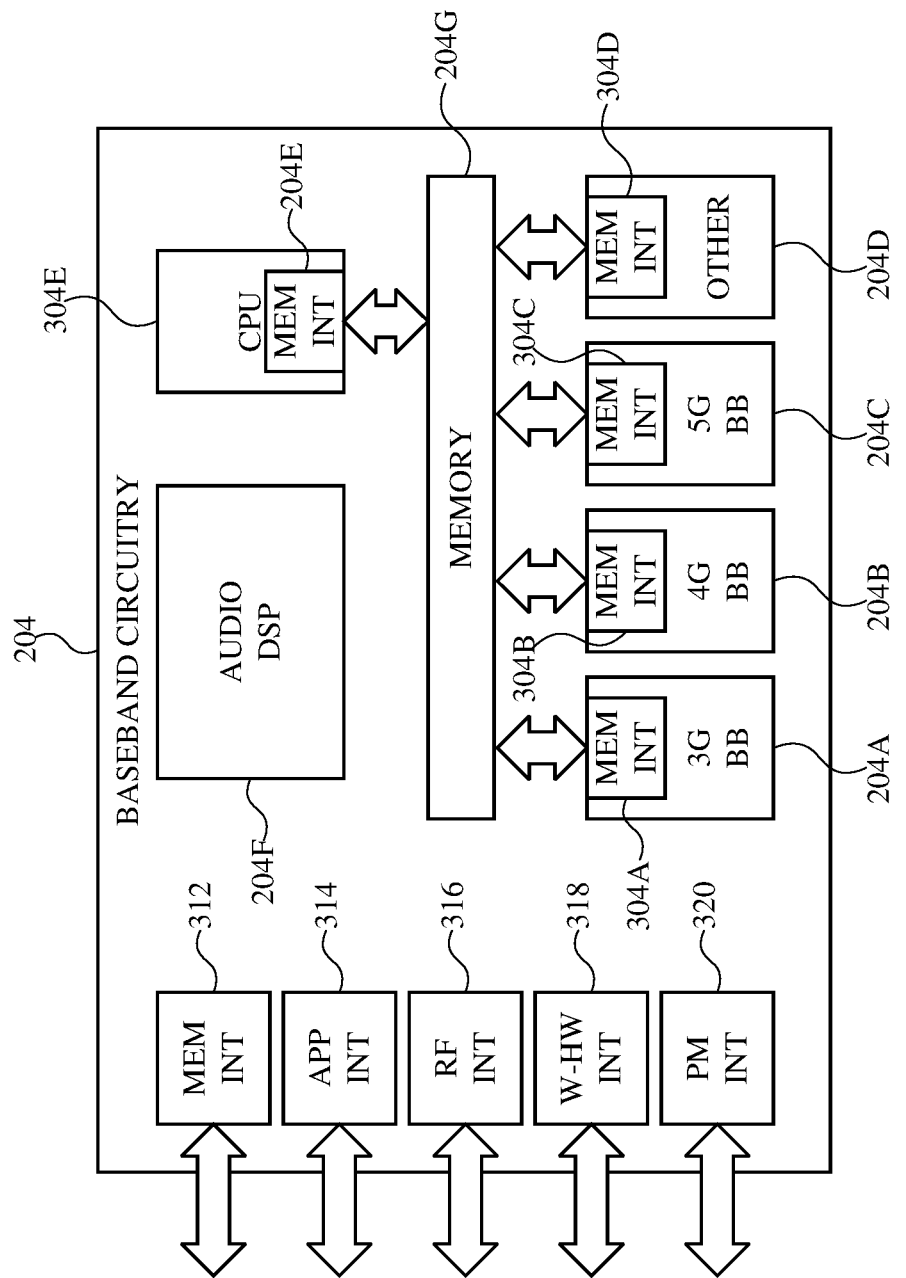
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

As discussed in greater detail herein, various embodiments, which can be employed, for example, at a UE or a node of a RAN, can facilitate configuration of a UE with two or more DRX configurations, according to techniques discussed in greater detail below. A first set of techniques can be employed to configure dual DRX for a UE for one or more FR1 cells (e.g., employing a first DRX configuration) and one or more FR2 cells (e.g., employing a second DRX configuration). A second set of techniques can be employed to configure dual (or multiple) DRX for a UE for one or more cells of a first frequency band (e.g., employing a first DRX configuration) and one or more cells of a second frequency band (e.g., employing a second DRX configuration), and optionally one or more cells of at least one additional frequency band (e.g., employing at least one additional DRX configuration). Various embodiments can employ one or more techniques of the first set of techniques and/or the second set of techniques.

Figure 4:
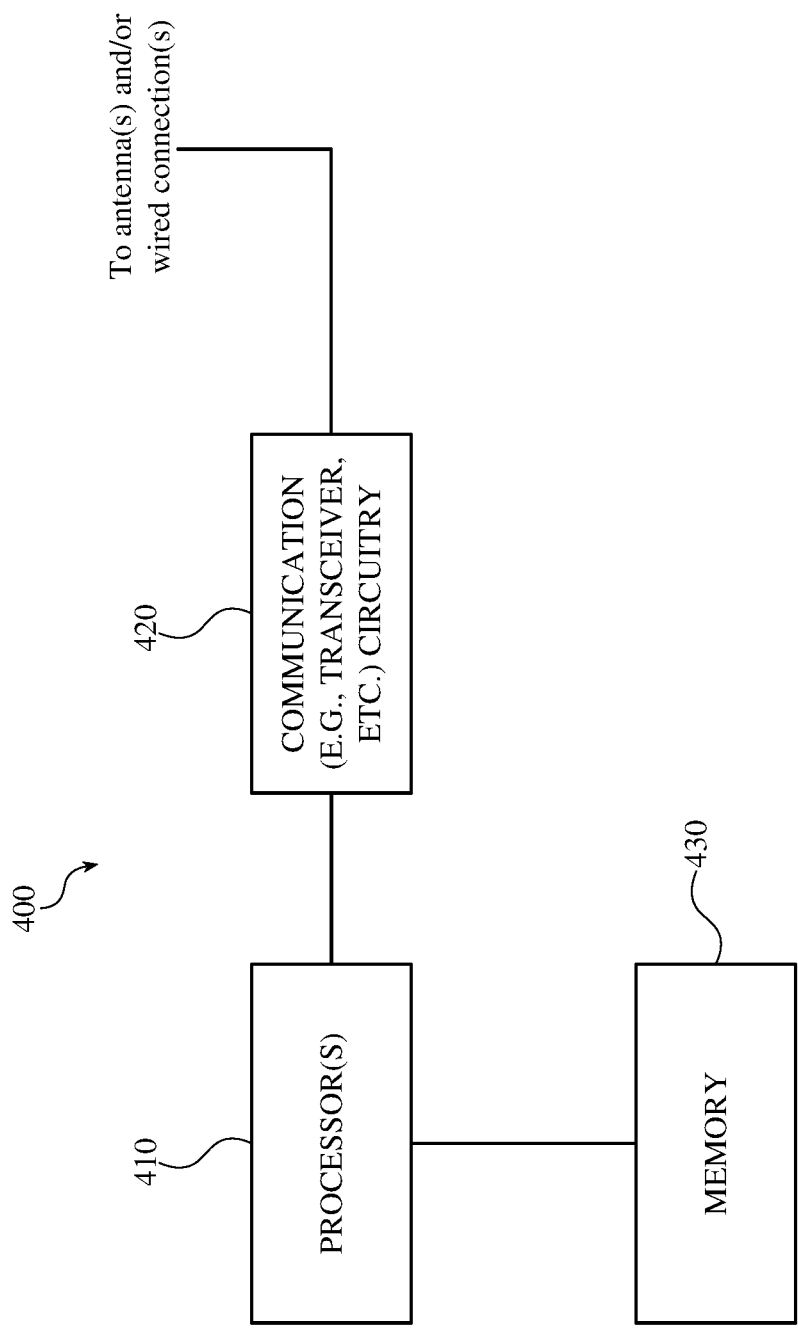
FIG. 4 is a block diagram illustrating a system that facilitates configuration of a UE with two or more Discontinuous Reception (DRX) configurations, according to various embodiments discussed herein.

Referring to FIG. 4, illustrated is a block diagram of a system 400 employable at a UE (User Equipment), a next generation Node B (gNodeB or gNB) or other BS (base station)/TRP (Transmit/Receive Point), or another component of a 3GPP (Third Generation Partnership Project) network (e.g., a 5GC (Fifth Generation Core Network)) component or function such as a UPF (User Plane Function)) that facilitates configuration of a UE with two or more DRX configurations (e.g., one for each of FR1 and FR2, one for each of two or more different frequency bands, etc.), according to various embodiments discussed herein. System 400 can include processor(s) 410, communication circuitry 420, and memory 430. Processor(s) 410 (e.g., which can comprise one or more of 202 and/or 204A-204F, etc.) can comprise processing circuitry and associated interface(s) (e.g., a communication interface (e.g., RF circuitry interface 316) for communicating with communication circuitry 420, a memory interface (e.g., memory interface 312) for communicating with memory 430, etc.). Communication circuitry 420 can comprise, for example circuitry for wired and/or wireless connection(s) (e.g., 206 and/or 208), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory 204G, local memory (e.g., including CPU register(s)) of processor(s) discussed herein, etc.) which can be of any of a variety of storage mediums (e.g., volatile and/or non-volatile according to any of a variety of technologies/constructions, etc.), and can store instructions and/or data associated with one or more of processor(s) 410 or transceiver circuitry 420).

Specific types of embodiments of system 400 (e.g., UE embodiments) can be indicated via subscripts (e.g., system $400_{UE}$ comprising processor(s) $410_{UE}$, communication circuitry $420_{UE}$, and memory $430_{UE}$). In some embodiments, such as BS embodiments (e.g., system $400_{gNB}$) and network component (e.g., UPF (User Plane Function), etc.) embodiments (e.g., system $400_{UPF}$) processor(s) $410_{gNB}$ (etc.), communication circuitry (e.g., $420_{gNB}$, etc.), and memory (e.g., $430_{gNB}$, etc.) can be in a single device or can be included in different devices, such as part of a distributed architecture. In embodiments, signaling or messaging between different embodiments of system 400 (e.g., $400_1$ and $400_2$) can be generated by processor(s) $410_1$, transmitted by communication circuitry $420_1$ over a suitable interface or reference point (e.g., a 3GPP air interface, N3, N4, etc.), received by communication circuitry $420_2$, and processed by processor(s) $410_2$. Depending on the type of interface, additional components (e.g., antenna(s), network port(s), etc. associated with system(s) $400_1$ and $400_2$) can be involved in this communication.

In various aspects discussed herein, signals and/or messages can be generated and output for transmission, and/or transmitted messages can be received and processed. Depending on the type of signal or message generated, outputting for transmission (e.g., by processor(s) 410, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping to one or more Resource Elements (REs) (e.g., a scheduled set of resources, a set of time and frequency resources granted for uplink transmission, etc.), wherein each RE can span one subcarrier in a frequency domain and one symbol in a time domain (e.g., wherein the symbol can be according to any of a variety of access schemes, e.g., Orthogonal Frequency Division Multiplexing (OFDM), Single Carrier Frequency Division Multiple Access (SC-FDMA), etc.). Depending on the type of received signal or message, processing (e.g., by processor(s) 410, etc.) can comprise one or more of: identifying physical resources associated with the signal/message, detecting the signal/message, resource element group deinterleaving, demodulation, descrambling, and/or decoding.

In various aspects, one or more of information (e.g., system information, resources associated with signaling, etc.), features, parameters, etc. can be configured to a UE via signaling (e.g., associated with one or more layers, such as L1 signaling or higher layer signaling (e.g., MAC, RRC, etc.)) from a gNB or other access point (e.g., via signaling generated by processor(s) $410_{gNB}$, transmitted by communication circuitry $420_{gNB}$, received by communication circuitry $420_{UE}$, and processed by processor(s) $410_{UE}$. Depending on the type of information, features, parameters, etc., the type of signaling employed and/or the exact details of the operations performed at the UE and/or gNB in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

Various embodiments relate to configuring more than one DRX configuration to a UE (e.g., a first DRX configuration for FR1 cells and a second DRX configuration for FR2 cells; and/or a first DRX configuration for cells of a first frequency band, a second DRX configuration for cells of a second frequency band, and optionally at least one additional DRX configuration for cells of at least one additional frequency band. Briefly, a UE in DRX mode can operate (e.g., via a Medium Access Control (MAC) entity of the UE, e.g., as implemented by processors $410_{UE}$, etc.) according to a DRX cycle (e.g., the long DRX cycle or the short DRX cycle) that can allow for discontinuous monitoring of PDCCH, etc., which can provide for reduced power consumption. DRX operation can be controlled and/or configured via Radio Resource Control (RRC) by configuring a number of parameters associated with DRX operation (e.g., via RRC signaling generated by processor(s) $410_{gNB}$, transmitted by communication circuitry $420_{gNB}$, received by communication circuitry $420_{UE}$, and processed by processor(s) $410_{UE}$). These parameters can comprise some or all of the following parameters: drx-onDurationTimer, the duration at the beginning of a DRX Cycle; drx-SlotOffset, the delay before starting the drx-onDurationTimer; drx-InactivityTimer, the duration after the PDCCH occasion in which a PDCCH indicates a new UL or DL transmission for the MAC entity; drx-RetransmissionTimerDL (per DL HARQ process except for the broadcast process), the maximum duration until a DL retransmission is received; drx-RetransmissionTimerUL (per UL HARQ process), the maximum duration until a grant for UL retransmission is received; drx-LongCycleStartOffset, the Long DRX cycle and drx-StartOffset which defines the subframe where the Long and Short DRX Cycle starts; drx-ShortCycle (optional), the Short DRX cycle; drx-ShortCycleTimer (optional), the duration the UE follows the Short DRX cycle; drx-HARQ-RTT-TimerDL (per DL HARQ process except for the broadcast process), the minimum duration before a DL assignment for HARQ retransmission is expected by the MAC entity; and drx-HARQ-RTT-TimerUL (per UL HARQ process): the minimum duration before a UL HARQ retransmission grant is expected by the MAC entity. In various embodiments, one or more of these parameters can vary between different DRX configurations of two or more DRX configurations for a UE (e.g., one for FR1 and one for FR2, two or more different DRX configurations for two or more bands of a band combination, etc.).

A UE (e.g., comprising system $400_{UE}$) can save power via a DRX cycle by shutting off RF circuitry (e.g., RF circuitry 206) during some or all of the time in the DRX cycle other than Active Time. Active Time (e.g., involving PDCCH monitoring, etc.) of a DRX cycle comprises time when one or more of the following is true: (1) drx-onDurationTimer or drx-InactivityTimer or drx-RetransmissionTimerDL or drx-RetransmissionTimerUL or ra-ContentionResolutionTimer (related to contention resolution for contention-based random access requests) is running; or (2) a Scheduling Request is sent on PUCCH and is pending; or (3) a PDCCH indicating a new transmission addressed to the Cell Radio Network Temporary Identifier (C-RNTI) of the MAC entity has not been received after successful reception of a Random Access Response for the Random Access Preamble not selected by the MAC entity among the contention-based Random Access Preamble.

In various aspects, embodiments discussed herein can facilitate configuring a UE (e.g., employing system $400_{UE}$) with two or more Discontinuous Reception (DRX) configurations (e.g., a first DRX configuration for FR1 and a second DRX configuration for FR2, a first DRX configuration for a first band (e.g., in FR1 or FR2) and a second DRX configuration for a second band (e.g., in FR1 or FR2), etc.). As discussed above, operation in FR1 can be significantly different than operation in FR2. Because of the higher bandwidth and power consumption of FR2 operation, it can be advantageous in some scenarios to operate less frequently in FR2 than FR1. Various embodiments can provide this and other advantages via the ability to separately configure two or more DRX configurations (also referred to herein as dual DRX, multiple DRX, etc.) a UE (e.g., for FR1/FR2 Carrier Aggregation (CA), for CA involving two or more bands (e.g., inter-band CA, inter-band and intra-band CA, etc.), etc.), including improved power saving over existing systems.

In the 3GPP (Third Generation Partnership Project) RAN2 #108 (RAN (Radio Access Network) WG2 (Working Group 2) Meeting #108), RAN2 discussed a power saving enhancement when both FR1 and FR2 cells are configured via Carrier Aggregation. With this enhancement, the FR2 cells can be configured with a separate (and shorter) drx-InactivityTimer (the duration at the beginning of a DRX Cycle) and drx-onDurationTimer (the duration after the PDCCH occasion in which a PDCCH indicates a new UL or DL transmission for the MAC entity) compared to the FR1 cells. The length of the Long DRX cycle (and of the Short DRX cycle, if configured) are common for both FR1 and FR2. This enhancement enables the FR2 cells to go to sleep more quickly and thereby reduce power consumption.

Figure 5:
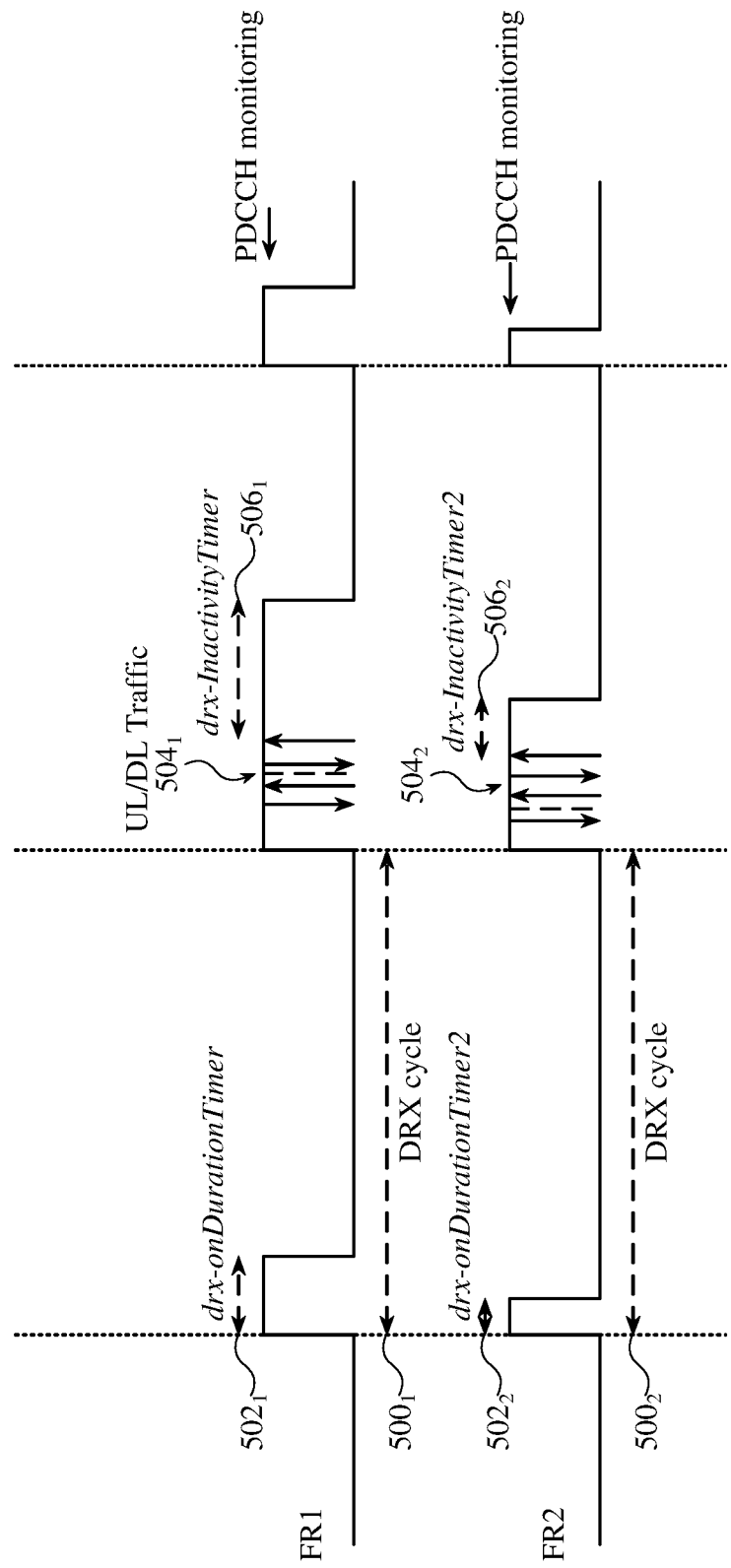
FIG. 5 is an example timing diagram illustrating a carrier aggregation scenario wherein Frequency Range (FR1) cells and Frequency (FR2) cells of a UE are configured with the same DRX cycle, but with different values for drx-InactivityTimer and drx-onDurationTimer, according to various aspects discussed herein.

Referring to FIG. 5, illustrated is an example timing diagram showing a carrier aggregation scenario wherein FR1 cells and FR2 cells of a UE are configured with the same DRX cycle, but with different values for drx-InactivityTimer and drx-onDurationTimer, according to various aspects discussed herein. FIG. 5 shows an example of two different DRX configurations for FR1 and FR2. As can be seen, DRX cycle $500_1$ for FR1 is the same as DRX cycle $500_2$ for FR2, as they have the same length and begin at the same time. However, the two DRX configurations can have different DRX on duration timers $502_1$ and $502_2$, as configured via by drx-onDurationTimer for FR1 and drx-onDurationTimer2 for FR2 (drx-onDurationTimer2 is used herein to refer to a parameter that operates, for a second DRX configuration, in the same manner as drx-onDurationTimer does for a first DRX configuration). Additionally, after Uplink (UL) and/or Downlink (DL) traffic $504_1$ and $504_2$, the two DRX configurations can also have different DRX inactivity timers $506_1$ and $506_2$, as configured via by drx-InactivityTimer for FR1 and drx-InactivityTimer2 for FR2 (drx-InactivityTimer2 is used herein to refer to a parameter that operates, for a second DRX configuration, in the same manner as drx-InactivityTimer does for a first DRX configuration). Thus, different DRX configurations can be employed, for example, to provide more Active Time for Physical Downlink Control Channel monitoring (PDCCH), etc. on FR1 cells than on FR2 cells.

RAN2 reached the following agreements, conditional on RAN1 (RAN WG1) acceptance: (a) A separate drx-InactivityTimer and drx-onDurationTimer can be configured for the secondary DRX group (RAN2 understands that this has zero or almost zero impact in RAN1 and RAN4 (RAN WG4)); (b) The combination of cross-carrier scheduling and secondary DRX group is not supported; (c) For Further Study (FFS) if timers for FR2 DRX configuration are shorter than timers for FR1 DRX configuration; and (d) The intention is to apply a secondary DRX configuration to FR2 and the existing DRX configuration to FR1.

However, in RAN4 Technical Specification (TS) 38.133, dual DRX in Dual Connectivity (DC) mode has the following conditions on interruption: (a) In NR DC, when both PCell (Primary Cell) and PSCell (Primary SCell (Secondary Cell) are in DRX, no interruption is allowed; and (b) the UE capability should be carefully considered before configuring dual DRX from network, and therefore a new mechanism can be introduced for both network and UE to support this dual DRX.

To address these issues, various embodiments can employ one or more techniques discussed herein that can facilitate dual DRX operation of a UE according to various embodiments discussed herein. A first set of techniques can be employed to configure dual DRX for a UE for one or more FR1 cells (e.g., employing a first DRX configuration) and one or more FR2 cells (e.g., employing a second DRX configuration) based on a UE capability of support of independent Measurement Gaps (MGs) for different frequency ranges (e.g., FR1 and FR2). A second set of techniques can be employed to configure dual (or multiple) DRX for a UE for one or more cells of a first frequency band (e.g., employing a first DRX configuration) and one or more cells of a second frequency band (e.g., employing a second DRX configuration), and optionally one or more cells of at least one additional frequency band (e.g., employing at least one additional DRX configuration), based on a UE capability of support for independent DRX configurations per Band Combination (BC). Various embodiments can employ one or more techniques of the first set of techniques and/or the second set of techniques.

Independent DRX Configuration for Independent Measurement Gap (MG) Capable UE

The first set of techniques comprise techniques related to techniques that facilitate configuration of two independent DRX configurations (e.g., a first DRX configuration for one or more FR1 cells and a second DRX configuration for one or more FR2 cells, etc.) based on a UE capability to support independent Measurement Gaps (MGs) for different frequency ranges (e.g., FR1 and FR2) (also referred to herein as per-FR MG(s)). Techniques of the first set of techniques are discussed below from both the perspective of a UE (e.g., comprising system $400_{UE}$) and the Network (NW), for example, acting via a gNB (e.g., comprising system $400_{gNB}$).

From the perspective of a UE, the UE can have a capability to support independent MG configuration for FR1 and FR2, which can allow the UE to support per-FR DRX configuration, for example, dual DRX configuration without interruption in FR1+FR2 CA. The UE can inform the network of this capability via a UE capability information message sent to the network via higher layer signaling (e.g., Radio Resource Control (RRC)). In various embodiments, for dual DRX configuration according to the first set of techniques, a first DRX configuration can be applied for FR1 Component Carriers (CC(s)) and a second DRX configuration (which can differ from the first DRX configuration, but need not) can be applied for FR2 CC(s). For example, the first and second DRX configurations can (but do not have to) have different values for one or more of drx-onDurationTimer, drx-InactivityTimer, and/or one or more other DRX parameters. In various embodiments, the two DRX configurations can configure the same DRX cycle for FR1 and FR2 in terms of length and start (although in some embodiments, this can vary).

The UE can operate associated RF circuitry for each FR independently in connection with the two DRX configurations. For each of FR1 and FR2, the UE can switch on the associated RF circuitry for that FR for transitions from DRX inactive status to DRX active status, or from DRX status to non-DRX status. Similarly, for each of FR1 and FR2, the UE can switch off the associated RF circuitry for that FR for transitions from DRX active status to DRX inactive status, or from non-DRX status to DRX status. For each of FR1 and FR2, the UE can switch off or on the associated RF circuitry without causing an interruption on transmission or reception over the other FR.

Figure 6:
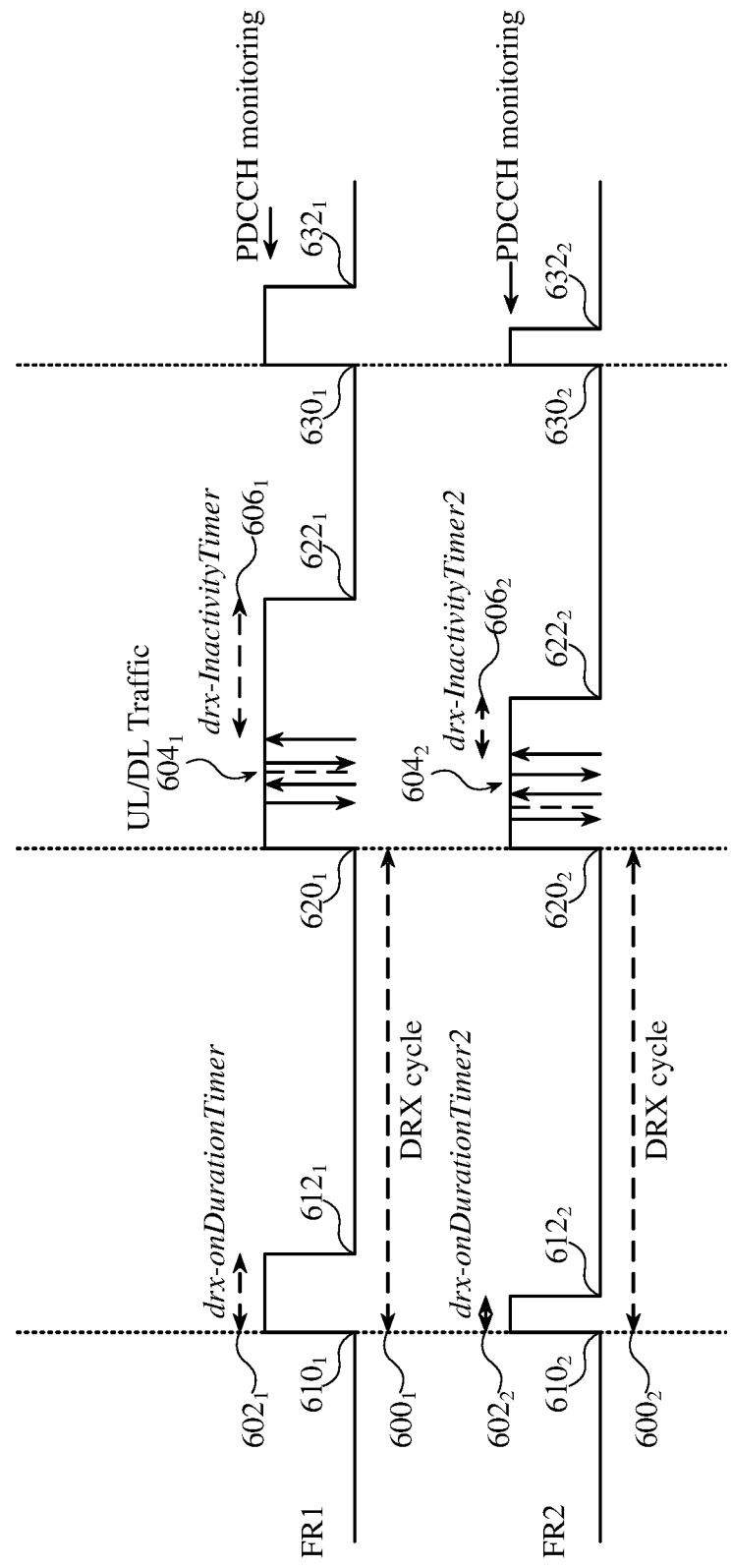
FIG. 6 is an example timing diagram illustrating operation of different DRX configurations for FR1 and FR2 by a UE capable of independent Measurement Gaps (MGs) for FR1 and FR2 (or per-FR MGs), according to various embodiments discussed herein.

Referring to FIG. 6, illustrated is an example timing diagram showing operation of different DRX configurations for FR1 and FR2 by a UE capable of independent MGs for FR1 and FR2 (or per-FR MGs), according to various embodiments discussed herein. FIG. 6 is similar to FIG. 5, wherein FR1 cells and FR2 cells of a UE are configured with the same DRX cycle, but with different values for drx-InactivityTimer and drx-onDurationTimer, but also shows operations of associated RF circuitry for FR1 and FR2 for a UE capable of supporting per-FR MGs. In FIGS. 6, $600_1$-$606_1$ and $600_2$-$606_2$ are similar to $500_1$-$506_1$ and $500_2$-$506_2$ in FIG. 5.

The associated RF circuitry for FR1 can be switched on at the start of each of the three DRX cycles illustrated in FIG. 6, as shown at $610_1$, $620_1$, and $630_1$, and can be switched off at the end of active time of each of these three DRX cycles, as shown at $612_1$, $622_1$, and $632_1$. This can save power compared to continuous operation on FR1, and can be done independently of the associated RF circuitry for FR2, that is, without causing interruption in transmission or reception on FR2.

Similarly, the associated RF circuitry for FR2 can be switched on at the start of each of the three DRX cycles illustrated in FIG. 6, as shown at $610_2$, $620_2$, and $630_2$, and can be switched off at the end of active time of each of these three DRX cycles, as shown at $612_2$, $622_2$, and $632_2$. This can save power compared to continuous operation on FR2, and can be done independently of the associated RF circuitry for FR1, that is, without causing interruption in transmission or reception on FR1.

Additionally, although the example in FIG. 6 shows both FR1 CC(s) and FR2 CC(s) in DRX mode, in various embodiments, the first set of techniques can also be employed in connection with only one of FR1 CC(s) or FR2 CC(s) in DRX mode, providing power saving relative to the FR that is in DRX mode, without interruption in transmission or reception of the CC(s) of the FR that is not in DRX mode.

From the network perspective, the network can use the UE capability (e.g., indicated via UE capability information) of independent measurement gap (or per-FR MG) to determine if DRX can be configured per FR for the UE. In various embodiments, the UE capability of independent measurement gap can be used to determine if dual DRX groups can be configured for a UE on FR1 CC(s) and FR2 CC(s) (e.g., via signaling from system $400_{gNB}$). In the same or other embodiments, the UE capability of independent measurement gap can be used to determine if DRX can be configured on CC(s) of one FR (e.g., FR1 or FR2) without DRX being configured on CC(s) of the other FR (e.g., FR2 or FR1, respectively).

In various embodiments, when dual DRX groups are configured for FR1 and FR2, the configuration of the DRX groups can be selected to ensure that the DRX duration boundaries are aligned on the time domain for both the FR1 CC(s) and the FR2 CC(s). In such embodiments, the DRX periodicity can be the same between the two DRX configurations for the FR1 CC(s) and the FR2 CC(s). However, in those embodiments and in other embodiments, the DRX duration or active window can be different between the two DRX groups. Additionally, for dual DRX configuration according to the first set of techniques, the network (e.g., gNB, etc.) can expect there will be no interruptions from RF adjustment(s) (e.g., turning RF circuitry on or off, etc.) on CC(s) of one FR (e.g., FR1 or FR2) to CC(s) of the other FR (e.g., FR2 or FR1, respectively).

In various embodiments, when DRX is only configured for one FR for UE with FR1+FR2 CA (e.g., the network only configures DRX for CC(s) of one FR (e.g., FR1 or FR2) but not for CC(s) of the other FR (e.g., FR2 or FR1, respectively), the network can keep normal scheduling on the CC(s) for which no DRX is configured (e.g., FR2 or FR1, respectively), and can expect there will be no interruptions from RF adjustment(s) of CC(s) from the FR (e.g., FR1 or FR2, respectively) for which DRX is configured.

Figure 7:
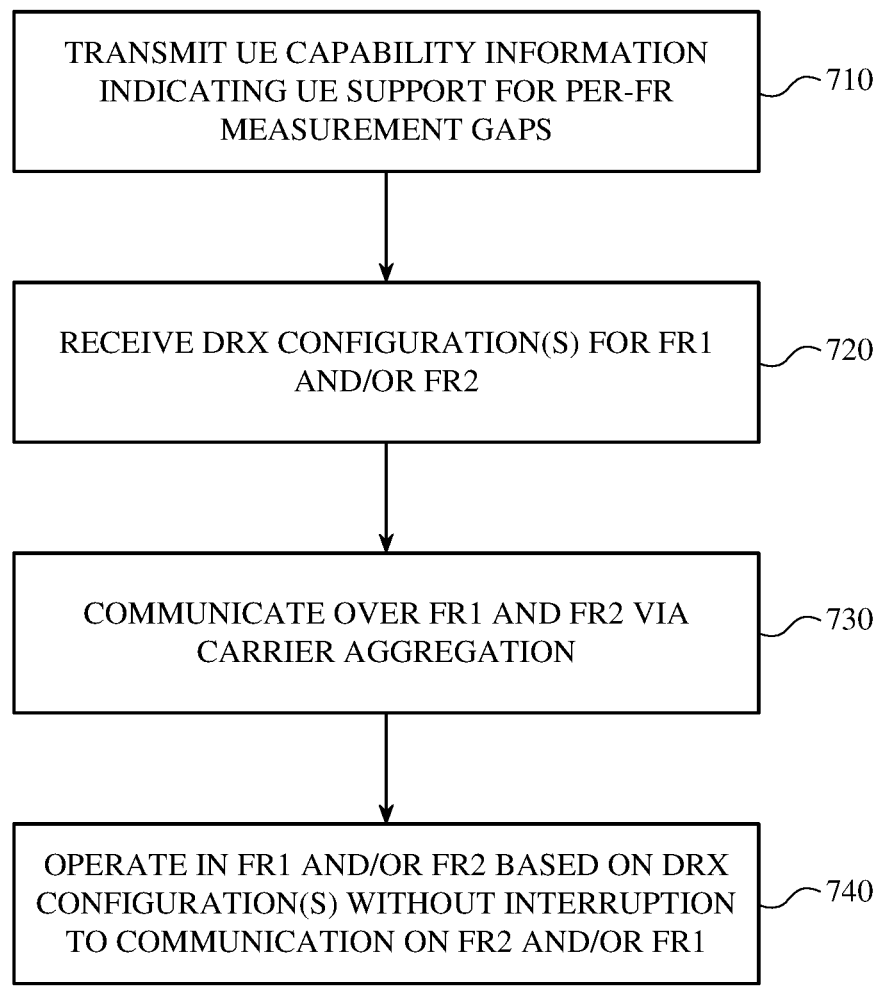
FIG. 7 is a flow diagram illustrating an example method employable at a UE that facilitates operation of different DRX configurations for FR1 and FR2, according to various embodiments discussed herein.

Referring to FIG. 7, illustrated is a flow diagram of an example method employable at a UE that facilitates operation of different DRX configurations for FR1 and FR2, according to various embodiments discussed herein. In other aspects, a machine readable medium can store instructions associated with method 700 that, when executed, can cause a UE (e.g., employing system $400_{UE}$) to perform the acts of method 700.

At 710, UE capability information can be transmitted to a gNB, wherein the UE capability information indicates UE support for per-FR MGs (or independent MGs for FR1 and FR2).

At 720, the UE can be configured with one or more of a DRX configuration for FR1 (e.g., which can be employed for CC(s) on FR1) or a DRX configuration for FR2 (e.g., which can be employed for CC(s) on FR2). Various characteristics (e.g., parameters, etc.) of these DRX configuration(s) can be configured independently from each other, as described in greater detail herein.

At 730, the UE can communicate over FR1 and FR2 via Carrier Aggregation (CA), involving at least one CC on FR1 and at least one CC on FR2.

At 740, the UE can operate on FR1 and/or FR2 based on the configured DRX configuration(s), which can comprise one or more of turning associated RF circuitry (e.g., for FR1 and/or FR2) on and/or off to save power without interrupting communication over FR2 and/or FR1, respectively (e.g., DRX operation on FR1, if configured, is performed without interrupting communication over FR2 and/or DRX operation on FR2, if configured, is performed without interrupting communication over FR1).

Additionally or alternatively, method 700 can include one or more other acts described herein in connection with various embodiments of a UE and/or system $400_{UE}$ and the first set of techniques.

Figure 8:
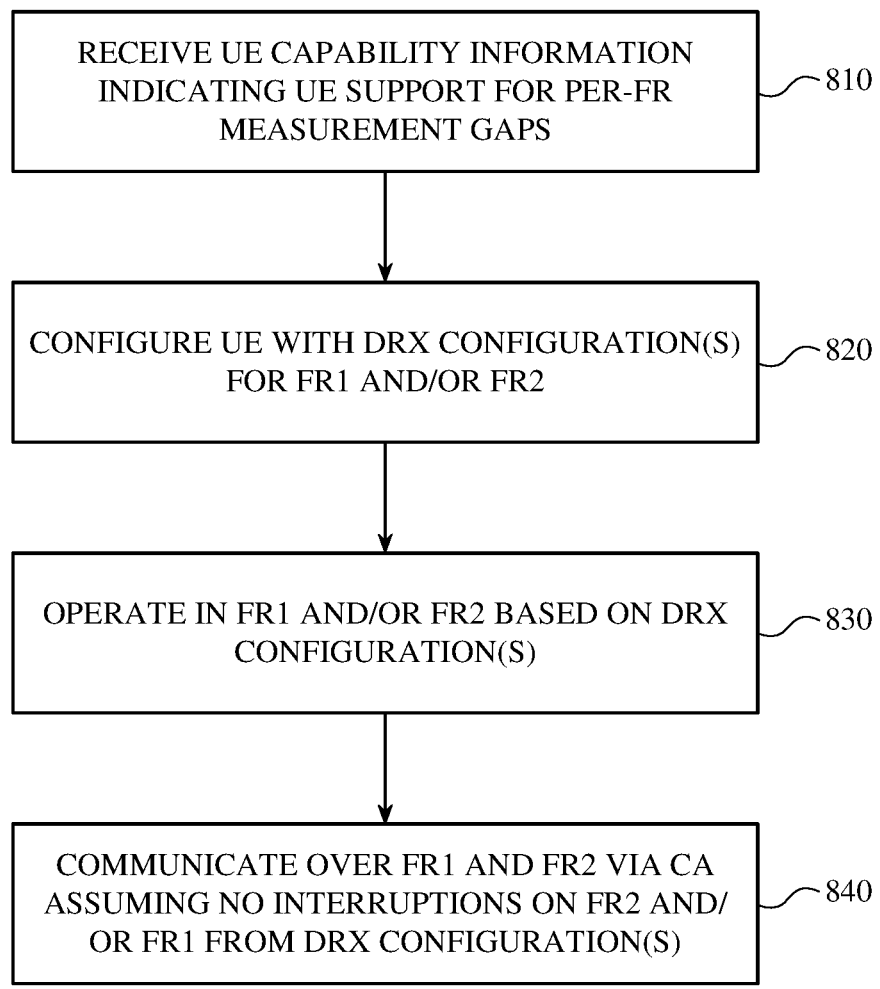
FIG. 8 is a flow diagram illustrating an example method employable at a next generation NodeB (gNB) that facilitates configuration of a UE with different DRX configurations for FR1 and FR2, according to various embodiments discussed herein.

Referring to FIG. 8, illustrated is a flow diagram of an example method employable at a gNB that facilitates configuration of a UE with different DRX configurations for FR1 and FR2, according to various embodiments discussed herein. In other aspects, a machine readable medium can store instructions associated with method 800 that, when executed, can cause a gNB (e.g., employing system $400_{gNB}$) to perform the acts of method 800.

At 810, UE capability information can be received from a UE, wherein the UE capability information indicates UE support for per-FR MGs (or independent MGs for FR1 and FR2).

At 820, the UE can be configured with one or more of a DRX configuration for FR1 (e.g., which can be employed for CC(s) on FR1) or a DRX configuration for FR2 (e.g., which can be employed for CC(s) on FR2). Various characteristics (e.g., parameters, etc.) of these DRX configuration(s) can be configured independently from each other, as described in greater detail herein.

At 830, the gNB can operate in FR1 and/or FR2 based on the DRX configuration(s) configured at 820 (e.g., scheduling, transmitting, and/or receiving DL and/or UL control and data based on the associated DRX cycle and Active Time(s) of the UE for FR1 and/or FR2, etc.).

At 840, the gNB can communicate (e.g., and schedule communication, etc.) with the UE over FR1 and FR2 via Carrier Aggregation based on an assumption that UE operation according to the DRX configuration(s) on FR1 and/or FR2 will not cause interruption(s) in communication over FR2 and/or FR1, respectively.

Additionally or alternatively, method 800 can include one or more other acts described herein in connection with various embodiments of a gNB and/or system $400_{gNB}$ and the first set of techniques.

Independent DRX Configuration Based on Per-Band Combination (BC) Capability

The first set of techniques comprise techniques related to techniques that facilitate configuration of two or more independent DRX configurations (e.g., a first DRX configuration for one or more cells in a first frequency band (e.g., Band A) and a second DRX configuration for one or more cells in a second frequency band (e.g., Band B), etc.) based on a UE capability to support independent DRX configurations for a given Band Combination (also referred to herein as per-FR MG(s)). Techniques of the second set of techniques are discussed below from both the perspective of a UE (e.g., comprising system $400_{UE}$) and the Network (NW), for example, acting via a gNB (e.g., comprising system $400_{gNB}$).

From the perspective of a UE, the UE can have a capability to support independent DRX configuration per band combination (BC) for one or more BCs, for example, dual DRX configuration without interruption in CA of a first band (e.g., Band A) and a second band (e.g., Band B). A given UE can potentially support independent DRX for two or more BCs, and the operation with respect to each BC can be as described in connection with the second set of techniques. Accordingly, for ease of discussion, a single BC is discussed in connection with various embodiments, even if independent DRX is potentially supported for more than one BC. The UE can inform the network of this capability via a UE capability information message sent to the network via higher layer signaling (e.g., Radio Resource Control (RRC)). A UE capable of supporting independent DRX for a given BC can implement two separate DRX configurations on the given BC, for example, a first DRX configuration on one or more first CC(s) of a first band (e.g., band A) and a second DRX configuration (which can differ, but need not) on one or more second CC(s) of a second band (e.g., band B), when the UE is operating on CA of the one or more first CC(s) with the one or more second CC(s) and supports independent DRX for the BC of the first band and the second band. Although referred to herein as a first band (e.g., or Band A) and a second band (e.g., or Band B), in various embodiments, it is to be appreciated that the first band (e.g., or Band A) and a second band (e.g., or Band B) can be the same band or different bands, and if different bands, can be within the same FR (e.g., FR1 or FR2) or different FRs (e.g., FR1 and FR2).

For a given set of configured CC(s) for a UE, the UE can apply different DRX configurations for different CC(s) as long as the UE can support independent DRX for the combinations of those CC(s). For dual or multiple DRX configuration according to the second set of techniques, different DRX configurations can be applied for different CC(s). For example, the first and second DRX configurations can (but do not have to) have different values for one or more of drx-onDurationTimer, drx-InactivityTimer, and/or one or more other DRX parameters. The CC(s) with independent DRX configurations can comprise two or more CC(s) that are in different bands (inter-band CA) and/or two or more CC(s) that are in the same band (intra-band CA).

The UE can operate associated RF circuitry for each of two (or more) sets of CC(s) independently in connection with the two (or more) DRX configurations, assuming the combination of sets of CC(s) is one for which the UE supports independent DRX configurations. For each set of CC(s) associated with a given DRX configuration, the UE can switch on the associated RF circuitry for that set of CC(s) for transitions from DRX inactive status to DRX active status, or from DRX status to non-DRX status. Similarly, for each set of CC(s) associated with a given DRX configuration, the UE can switch off the associated RF circuitry for that set of CC(s) for transitions from DRX active status to DRX inactive status, or from non-DRX status to DRX status. For each set of CC(s) associated with a given DRX configuration, the UE can switch off or on the associated RF circuitry without causing an interruption on transmission or reception over the other set(s) of CC(s).

Figure 9:
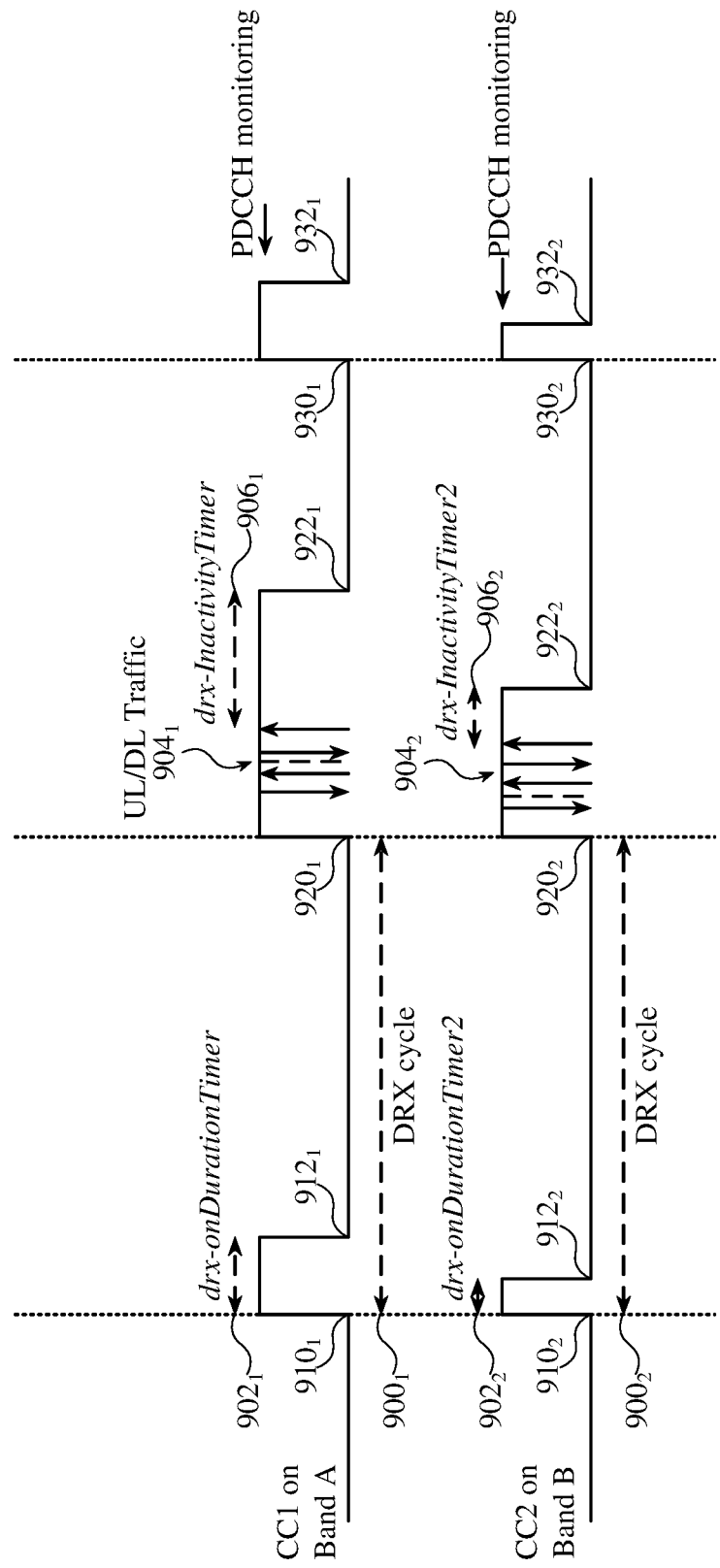
FIG. 9 is an example timing diagram illustrating operation of different DRX configurations for a first Component Carrier (CC1) on Band A and for CC2 on Band B, for a UE capable of independent DRX configuration for the band combination A+B, according to various embodiments discussed herein.

Referring to FIG. 9, illustrated is an example timing diagram showing operation of different DRX configurations for a first CC (CC1) on a first band (Band A) and for a second CC (CC2) on a second band (Band B), for a UE capable of independent DRX configuration for the band combination A+B, according to various embodiments discussed herein. FIG. 9 is similar to FIG. 6, wherein CC1 and CC2 are configured with the same DRX cycle for the UE, but with different values for drx-InactivityTimer and drx-onDurationTimer, and also shows operations of associated RF circuitry for Band A and Band B for a UE capable of supporting independent DRX configurations for Bands A and B. In FIGS. 9, $900_1$-$932_1$ and $900_2$-$932_2$ are similar to $600_1$-$632_1$ and $600_2$-$632_2$ in FIG. 6, but for CC1 on Band A instead of FR1 and CC2 on Band B instead of FR2, respectively.

The associated RF circuitry for CC1 on Band A can be switched on at the start of each of the three DRX cycles illustrated in FIG. 9, as shown at $910_1$, $920_1$, and $930_1$, and can be switched off at the end of active time of each of these three DRX cycles, as shown at $912_1$, $922_1$, and $932_1$. This can save power compared to continuous operation on CC1, and can be done independently of the associated RF circuitry for CC2 on Band B, that is, without causing interruption in transmission or reception on CC2.

Similarly, the associated RF circuitry for CC2 on Band B can be switched on at the start of each of the three DRX cycles illustrated in FIG. 9, as shown at $910_2$, $920_2$, and $930_2$, and can be switched off at the end of active time of each of these three DRX cycles, as shown at $912_2$, $922_2$, and $932_2$. This can save power compared to continuous operation on CC2, and can be done independently of the associated RF circuitry for CC1 on Band A, that is, without causing interruption in transmission or reception on CC1.

Additionally, although the example in FIG. 9 shows both CC1 on Band A and CC2 on Band B in DRX mode, in various embodiments, the second set of techniques can also be employed in connection with DRX mode being employed in only one band of a supported BC, providing power saving relative to the CC(s) that are in DRX mode, without interruption in transmission or reception of the CC(s) of the band(s) that are not in DRX mode.

Figure 10:
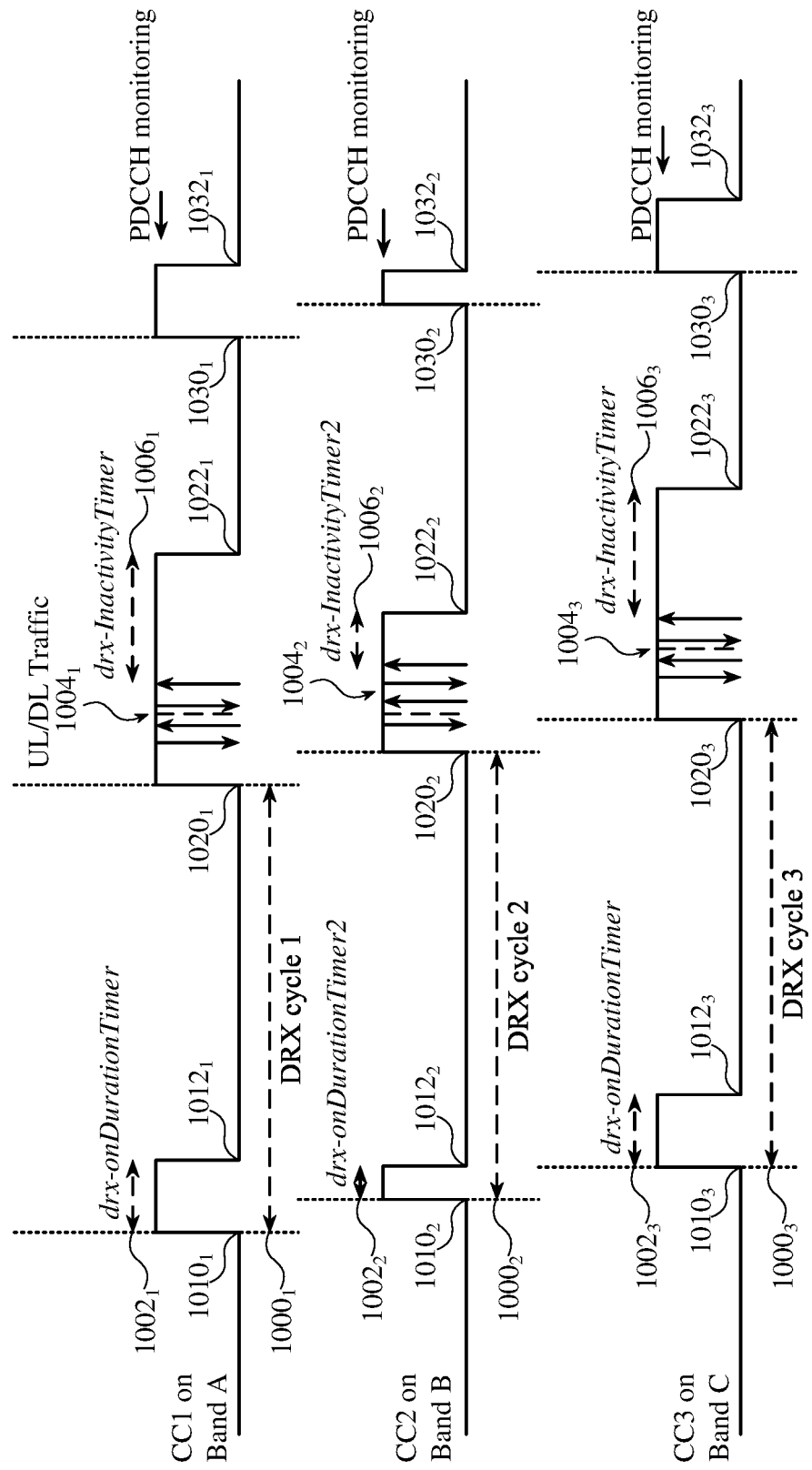
FIG. 10 is an example timing diagram illustrating operation of different DRX configurations for a first CC (CC1) on a first band (Band A), for a second CC (CC2) on a second band (Band B), and for a third CC (CC3) on a third band (Band C), for a UE capable of independent DRX configuration for the band combination A+B+C, according to various embodiments discussed herein.

Referring to FIG. 10, illustrated is an example timing diagram showing operation of different DRX configurations for a first CC (CC1) on a first band (Band A), for a second CC (CC2) on a second band (Band B), and for a third CC (CC3) on a third band (Band C), for a UE capable of independent DRX configuration for the band combination A+B+C, according to various embodiments discussed herein. FIG. 10 is similar to FIG. 9, wherein CC1 and CC3 are configured with first values for drx-InactivityTimer and drx-onDurationTimer and CC2 is configured with different second values for drx-InactivityTimer and drx-onDurationTimer, and each of CC1, CC2, and CC3 has a different DRX cycle. In FIG. 10, $1000_1$-$1032_1$ and $1000_2$-$1032_2$ are similar to $900_1$-$932_1$ and $900_2$-$932_2$ in FIG. 9, and $1000_3$-$1032_3$ are similar to $1000_1$-$1032_1$ and $1000_2$-$1032_2$, but for CC3 instead of CC1 or CC2. Additionally, in FIG. 10, each of CC1, CC2, and CC3 has a different DRX cycle, with the same length, but a different start. In various embodiments, other DRX parameters can vary between independent DRX configurations; for example, a short DRX cycle can be optionally configured on one or more CCs (e.g., all, some but not all, etc.) for which a UE supports independent DRX configurations.

From the network perspective, the network (e.g., communicating with the UE via gNB) can use the UE capability (e.g., indicated via UE capability information) of independent DRX per BC to determine if DRX can be configured on different CCs for the UE (e.g., based on whether those CCs align with a BC for which the UE supports independent DRX). In various embodiments, the UE capability of independent DRX per BC can be used to determine if dual DRX groups can be configured for a UE on different CCs, wherein those CCs can be intra-band CA (e.g., wherein a supported BC provides independent DRX for two or more CCs of that band, such as an example BC of A+A, etc.) or inter-band CA (e.g., wherein a supported BC provides independent DRX for CC(s) of a first band and CC(s) of a different second band, such as an example BC of A+B, etc.) for the UE. As one specific example, if a UE supports independent DRX for band A+B BC, and is configured for CA of CC1 and CC2 on band A and CC3 on band B, the network can configure one DRX for CC1 and CC2 and configure another DRX for CC3. In the same or other embodiments, the network (e.g., communicating with the UE via gNB) can use the UE capability of independent DRX per BC to determine if DRX can be configured on some CCs and no DRX can be configured on other CCs. As with the dual (or multiple, e.g., triple, etc.) DRX configuration, those CCs can be intra-band CA or inter-band CA for the UE.

If multiple DRX groups are configured for different CCs, the network can expect there will not be any interruption from the RF adjustment (e.g., switching associated RF circuitry on or off) of one group of CC(s) (e.g., configured with a first DRX configuration) to other group(s) of CC(s) (e.g., configured with a second DRX configuration, not configured for DRX, etc.), wherein each group of CC(s) can comprise CC(s) which are configured with an identical DRX configuration. In scenarios wherein DRX is only configured for one group of CC(s) for a UE (e.g., for a first group of CC(s) and a second group of CC(s) for which the UE supports independent DRX, the network configures DRX for the first group of CC(s) and does not configure DRX for the second group of CC(s)), the network can keep normal scheduling on the CC(s) (e.g., the second group of CC(s)) for which DRX is not configured, and the network can expect there will not be any interruption from the RF adjustment (e.g., switching associated RF circuitry on or off) of the CC(s) which have DRX configured (e.g., the first group of CC(s)).

Figure 11:
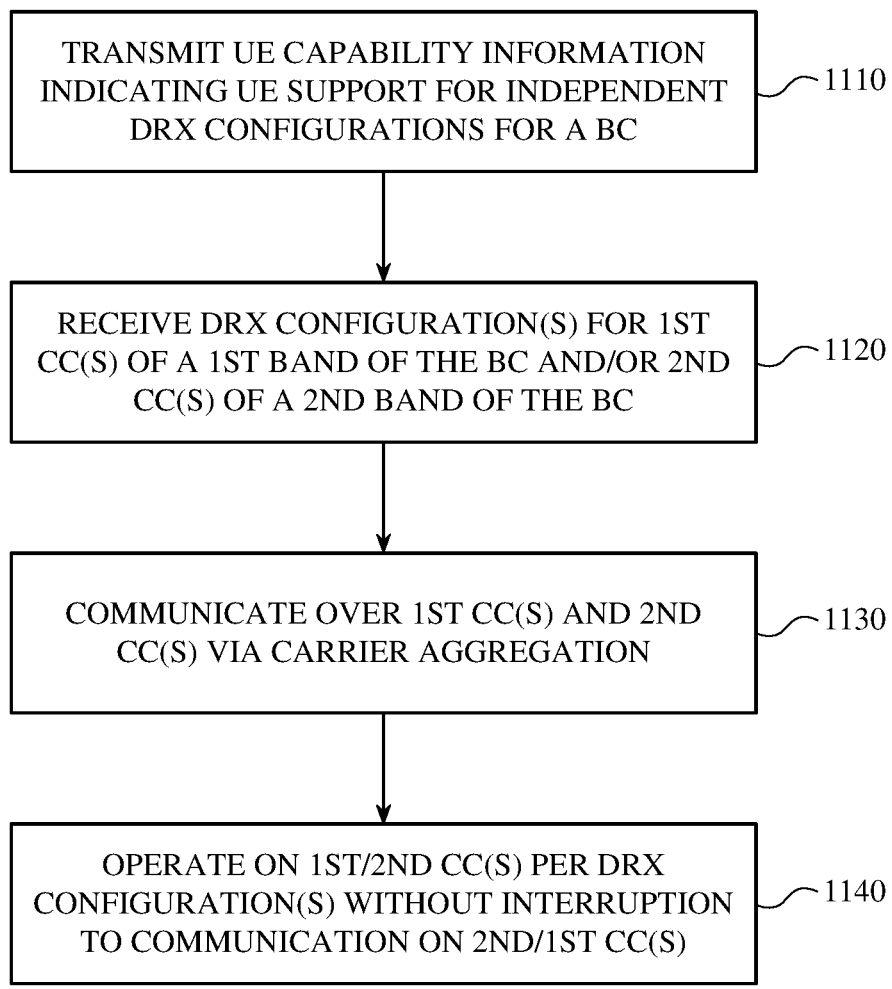
FIG. 11 is a flow diagram illustrating an example method employable at a UE that facilitates operation of independent DRX configurations for a first set of CC(s) and a second set of CC(s) based on a supported band combination, according to various embodiments discussed herein.

Referring to FIG. 11, illustrated is a flow diagram of an example method employable at a UE that facilitates operation of independent DRX configurations for a first set of CC(s) and a second set of CC(s) based on a supported band combination, according to various embodiments discussed herein. In other aspects, a machine readable medium can store instructions associated with method 1100 that, when executed, can cause a UE (e.g., employing system $400_{UE}$) to perform the acts of method 1100.

At 1110, UE capability information can be transmitted to a gNB, wherein the UE capability information indicates UE support for independent DRX configuration for the bands of a given band combination (BC).

At 1120, the UE can be configured with one or more of a first DRX configuration for one or more first CCs of a first band of the BC, a second DRX configuration for one or more second CCs of a second band of the BC, etc. Various characteristics (e.g., parameters, etc.) of these DRX configuration(s) can be configured independently from each other, as described in greater detail herein.

At 1130, the UE can communicate over the first CCs, second CCs, etc. via Carrier Aggregation (CA), involving at least one first CC on the first band and at least one second CC (different than the first CC) on the second band (wherein the first band and the second band can be the same or different, in various embodiments).

At 1140, the UE can operate on any of the first CC(s), second CC(s), etc. for which DRX is configured based on the configured DRX configuration(s), which can comprise one or more of turning associated RF circuitry (e.g., for any of the first CC(s), second CC(s), etc. for which DRX is configured) on and/or off to save power without interrupting communication over other CC(s) (e.g., DRX operation on the first CC(s), if configured, is performed without interrupting communication over the second CC(s) and/or DRX operation on the second CC(s), if configured, is performed without interrupting communication over the first CC(s)).

Additionally or alternatively, method 1100 can include one or more other acts described herein in connection with various embodiments of a UE and/or system $400_{UE}$ and the second set of techniques.

Figure 12:
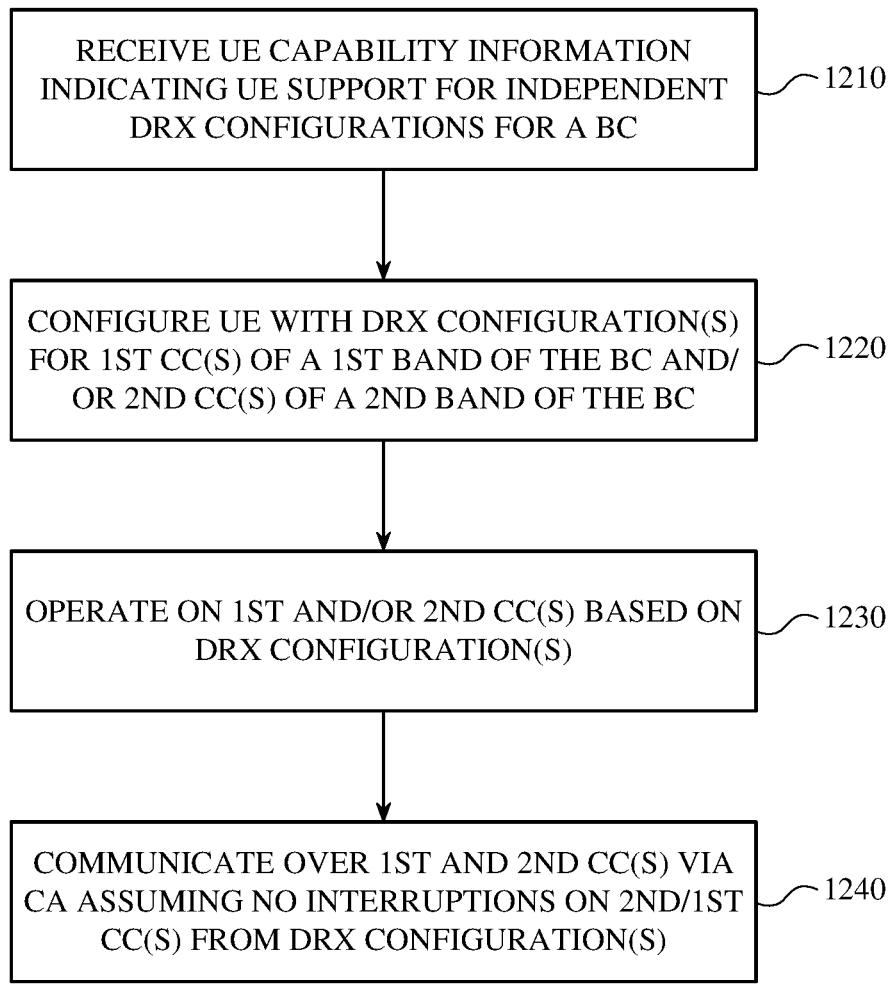
FIG. 12 is a flow diagram illustrating an example method employable at a gNB that facilitates configuration of a UE with independent DRX configurations for a first set of CC(s) and a second set of CC(s) based on a supported band combination, according to various embodiments discussed herein.

Referring to FIG. 12, illustrated is a flow diagram of an example method employable at a gNB that facilitates configuration of a UE with independent DRX configurations for a first set of CC(s) and a second set of CC(s) based on a supported band combination, according to various embodiments discussed herein. In other aspects, a machine readable medium can store instructions associated with method 1200 that, when executed, can cause a gNB (e.g., employing system $400_{gNB}$) to perform the acts of method 1200.

At 1210, UE capability information can be received from a UE, wherein the UE capability information indicates UE support for independent DRX configuration for the bands of a given band combination (BC).

At 1120, the UE can be configured with one or more of a first DRX configuration for one or more first CCs of a first band of the BC, a second DRX configuration for one or more second CCs of a second band of the BC, etc. Various characteristics (e.g., parameters, etc.) of these DRX configuration(s) can be configured independently from each other, as described in greater detail herein.

At 1130, the gNB can operate on any of the first CC(s), second CC(s), etc. for which DRX is configured based on the DRX configuration(s) configured at 1120 (e.g., scheduling, transmitting, and/or receiving DL and/or UL control and data based on the associated DRX cycle and Active Time(s) of the UE for any of the first CC(s), second CC(s), etc. for which DRX is configured).

At 1140, the gNB can communicate (e.g., and schedule communication, etc.) with the UE over the first CC(s), second CC(s), etc. via Carrier Aggregation based on an assumption that UE operation according to the DRX configuration(s) on any of the first CC(s), second CC(s), etc. for which DRX is configured will not cause interruption(s) in communication over any other CC(s).

Additionally or alternatively, method 1200 can include one or more other acts described herein in connection with various embodiments of a gNB and/or system 400$_{gNB}$ and the second set of techniques.

Additional Examples

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a User Equipment (UE), comprising: one or more processors configured to: generate UE capability information that comprises an indication that the UE supports one or more of independent Measurement Gaps (MGs) or per-Frequency Range (per-FR) MGs; process first configuration signaling that configures a first Discontinuous Reception (DRX) configuration for one of FR1 or FR2; communicate over FR1 and FR2 via Carrier Aggregation (CA); and operate in the one of FR1 or FR2 based on the first DRX configuration without causing an interruption in communication over the other of FR1 or FR2.

Example 2 comprises the subject matter of any variation of any of example(s) 1, wherein the one or more processors are further configured to switch on Radio Frequency (RF) circuitry associated with the one of FR1 or FR2 for an Active Time of a DRX cycle for the first DRX configuration.

Example 3 comprises the subject matter of any variation of any of example(s) 1-2, wherein the one or more processors are further configured to switch off Radio Frequency (RF) circuitry associated with the one of FR1 or FR2 for at least a portion of a DRX cycle for the first DRX configuration other than an Active Time of the DRX cycle.

Example 4 comprises the subject matter of any variation of any of example(s) 1-3, wherein the one or more processors are further configured to: process second configuration signaling that configures a second Discontinuous Reception (DRX) configuration for the other of FR1 or FR2; and operate in the other of FR1 or FR2 based on the second DRX configuration without causing an interruption in communication over the one of FR1 or FR2.

Example 5 comprises the subject matter of any variation of any of example(s) 4, wherein both the first DRX configuration and the second DRX configuration employ a common DRX cycle.

Example 6 comprises the subject matter of any variation of any of example(s) 4-5, wherein the first DRX configuration comprises a first drx-onDurationTimer parameter having a first value, and wherein the second DRX configuration comprises a second drx-onDurationTimer parameter having a second value that is different from the first value.

Example 7 comprises the subject matter of any variation of any of example(s) 4-6, wherein the first DRX configuration comprises a first drx-InactivityTimer parameter having a first value, and wherein the second DRX configuration comprises a second drx-InactivityTimer parameter having a second value that is different from the first value.

Example 8 is an apparatus configured to be employed in a next generation Node B (gNB), comprising: one or more processors configured to: process User Equipment (UE) capability information that comprises an indication that a UE supports one or more of independent Measurement Gaps (MGs) or per-Frequency Range (per-FR) MGs; generate first configuration signaling that configures a first Discontinuous Reception (DRX) configuration for one of FR1 or FR2; operate in the one of FR1 or FR2 based on the first DRX configuration; and communicate with the UE over FR1 and FR2 via Carrier Aggregation (CA) based on an assumption that the first DRX configuration will not cause an interruption by the UE in communication over the other of FR1 or FR2.

Example 9 comprises the subject matter of any variation of any of example(s) 8, wherein the one or more processors are further configured to: generate second configuration signaling that configures a second Discontinuous Reception (DRX) configuration for the other of FR1 or FR2; and operate in the other of FR1 or FR2 based on the second DRX configuration, wherein the communicating with the UE over FR1 and FR2 via CA is further based on an assumption that the second DRX configuration will not cause an interruption by the UE in communication over the one of FR1 or FR2.

Example 10 comprises the subject matter of any variation of any of example(s) 9, wherein both the first DRX configuration and the second DRX configuration employ a common DRX cycle.

Example 11 comprises the subject matter of any variation of any of example(s) 9-10, wherein the first DRX configuration comprises a first drx-onDurationTimer parameter having a first value, and wherein the second DRX configuration comprises a second drx-onDurationTimer parameter having a second value that is different from the first value.

Example 12 comprises the subject matter of any variation of any of example(s) 9-11, wherein the first DRX configuration comprises a first drx-InactivityTimer parameter having a first value, and wherein the second DRX configuration comprises a second drx-InactivityTimer parameter having a second value that is different from the first value.

Example 13 is an apparatus configured to be employed in a User Equipment (UE), comprising: one or more processors configured to: generate UE capability information that comprises an indication that the UE supports independent Discontinuous Reception (DRX) configurations for a Band Combination (BC) comprising a first band and a second band; process first configuration signaling that configures a first Discontinuous Reception (DRX) configuration for a first set of component carriers (CCs) in the first band;

communicate over the first set of CCs in the first band and a second set of CCs in the second band via Carrier Aggregation (CA); and operate on the first set of CCs in the first band based on the first DRX configuration without causing an interruption in communication over the second set of CCs in the second band.

Example 14 comprises the subject matter of any variation of any of example(s) 13, wherein the one or more processors are further configured to switch on Radio Frequency (RF) circuitry associated with the first set of CCs in the first band for an Active Time of a DRX cycle for the first DRX configuration.

Example 15 comprises the subject matter of any variation of any of example(s) 13-14, wherein the one or more processors are further configured to switch off Radio Frequency (RF) circuitry associated with the first set of CCs in the first band for at least a portion of a DRX cycle for the first DRX configuration other than an Active Time of the DRX cycle.

Example 16 comprises the subject matter of any variation of any of example(s) 13-15, wherein the one or more processors are further configured to: process second configuration signaling that configures a second Discontinuous Reception (DRX) configuration for the second set of CCs in the second band; and operate on the second set of CCs in the second band based on the second DRX configuration without causing an interruption in communication over the first set of CCs in the first band.

Example 17 comprises the subject matter of any variation of any of example(s) 16, wherein both the first DRX configuration and the second DRX configuration employ a common DRX cycle.

Example 18 comprises the subject matter of any variation of any of example(s) 16-17, wherein the first DRX configuration comprises a first drx-onDurationTimer parameter having a first value, and wherein the second DRX configuration comprises a second drx-onDurationTimer parameter having a second value that is different from the first value.

Example 19 comprises the subject matter of any variation of any of example(s) 16-18, wherein the first DRX configuration comprises a first drx-InactivityTimer parameter having a first value, and wherein the second DRX configuration comprises a second drx-InactivityTimer parameter having a second value that is different from the first value.

Example 20 is an apparatus configured to be employed in a next generation Node B (gNB), comprising: one or more processors configured to: process User Equipment (UE) capability information that comprises an indication that a UE supports independent Discontinuous Reception (DRX) configurations for a Band Combination (BC) comprising a first band and a second band; generate first configuration signaling that configures a first Discontinuous Reception (DRX) configuration for a first set of component carriers (CCs) in the first band; operate on the first set of CCs in the first band based on the first DRX configuration; and communicate with the UE over the first set of CCs in the first band and a second set of CCs in the second band via Carrier Aggregation (CA) based on an assumption that the first DRX configuration will not cause an interruption by the UE in communication over the second set of CCs in the second band.

Example 21 comprises the subject matter of any variation of any of example(s) 20, wherein the one or more processors are further configured to: generate second configuration signaling that configures a second Discontinuous Reception (DRX) configuration for the second set of CCs in the second band; and operate on the second set of CCs in the second band based on the second DRX configuration, wherein the communicating with the UE is further based on an assumption that the second DRX configuration will not cause an interruption by the UE in communication over the first set of CCs in the first band.

Example 22 comprises the subject matter of any variation of any of example(s) 21, wherein both the first DRX configuration and the second DRX configuration employ a common DRX cycle.

Example 23 comprises the subject matter of any variation of any of example(s) 21-22, wherein the first DRX configuration comprises a first drx-onDurationTimer parameter having a first value, and wherein the second DRX configuration comprises a second drx-onDurationTimer parameter having a second value that is different from the first value.

Example 24 comprises the subject matter of any variation of any of example(s) 21-23, wherein the first DRX configuration comprises a first drx-InactivityTimer parameter having a first value, and wherein the second DRX configuration comprises a second drx-InactivityTimer parameter having a second value that is different from the first value.

Example 25 comprises an apparatus comprising means for executing any of the described operations of examples 1-24.

Example 26 comprises a machine readable medium that stores instructions for execution by a processor to perform any of the described operations of examples 1-24.

Example 27 comprises an apparatus comprising: a memory interface; and processing circuitry configured to: perform any of the described operations of examples 1-24.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A User Equipment (UE), comprising:
a memory;

a transceiver; and
one or more processors configured to, when executing instructions stored in the memory, cause the UE to:
transmit, via the transceiver, UE capability information that comprises an indication that the UE supports one or more of independent Measurement Gaps (MGs) or per-Frequency Range (per-FR) MGs for a first frequency range and a second frequency range;
receive, via the transceiver, in response to the transmitted UE capability information, first configuration signaling that configures a first Discontinuous Reception (DRX) configuration for the first frequency range; and
communicate, via the transceiver, over the first frequency range and the second frequency range via Carrier Aggregation (CA), wherein the communicating over
the first frequency range includes communicating based on the first DRX configuration without causing an interruption in communication over the second frequency range.

2. The UE of claim 1, wherein the one or more processors are further configured to cause the UE to switch on Radio Frequency (RF) circuitry of the transceiver that is associated with the first frequency range for an Active Time of a DRX cycle for the first DRX configuration.

3. The UE of claim 1, wherein the one or more processors are further configured to cause the UE to switch off Radio Frequency (RF) circuitry of the transceiver that is associated with the first frequency range for at least a portion of a DRX cycle for the first DRX configuration other than an Active Time of the DRX cycle.

4. The UE of claim 1, wherein the one or more processors are further configured to cause the UE to:
receive, via the transceiver, in response to the transmitted UE capability information, second configuration signaling that configures a second DRX configuration for the second frequency range, wherein the communicating over
the second frequency range includes communicating based on the second DRX configuration without causing an interruption in communication over the first frequency range.

5. The UE of claim 4, wherein both the first DRX configuration and the second DRX configuration employ a common DRX cycle.

6. The apparatus UE of claim 4, wherein the first DRX configuration comprises a first drx-onDuration Timer parameter having a first value, and wherein the second DRX configuration comprises a second drx-onDuration Timer parameter having a second value that is different from the first value.

7. The UE of claim 4, wherein the first DRX configuration comprises a first drx-Inactivity Timer parameter having a first value, and wherein the second DRX configuration comprises a second drx-Inactivity Timer parameter having a second value that is different from the first value.

8. A base station, comprising:
a memory;
a transceiver; and
one or more processors configured to, when executing instructions stored in the memory, cause the base station to:
receive, via the transceiver, User Equipment (UE) capability information that comprises an indication that a UE supports one or more of independent Measurement Gaps (MGs) or per Frequency Range (per-FR) MGs for a first frequency range and a second frequency range;
transmit, via the transceiver, in response to the received UE capability information, first configuration signaling that configures a first Discontinuous Reception (DRX) configuration for the first frequency range; and
communicate, via the transceiver, with the UE over the first frequency range and the second frequency range via Carrier Aggregation (CA), wherein the communicating over the first frequency range includes communicating based on the first DRX configuration and based on an assumption that the first DRX configuration will not cause an interruption by the UE in communication over the second frequency range.

9. The base station of claim 8, wherein the one or more processors are further configured to cause the base station to:
transmit, via the transceiver, in response to the received UE capability information, second configuration signaling that configures a second DRX configuration for the second frequency range,
wherein the communicating with the UE over the second frequency range includes communicating based on the second DRX configuration and based on an assumption that the second DRX configuration will not cause an interruption by the UE in communication over the first frequency range.

10. The base station of claim 9, wherein both the first DRX configuration and the second DRX configuration employ a common DRX cycle.

11. The base station of claim 9, wherein the first DRX configuration comprises a first drx-onDurationTimer parameter having a first value, and wherein the second DRX configuration comprises a second drx-onDuration Timer parameter having a second value that is different from the first value.

12. The base station of claim 9, wherein the first DRX configuration comprises a first drx-Inactivity Timer parameter having a first value, and wherein the second DRX configuration comprises a second drx-Inactivity Timer parameter having a second value that is different from the first value.

13. A User Equipment (UE), comprising:
a memory;
a transceiver; and
one or more processors configured to, when executing instructions stored in the memory, cause the UE to:
transmit, via the transceiver, UE capability information that comprises an indication that the UE supports independent Discontinuous Reception (DRX) configurations for a Band Combination (BC) comprising a first band and a second band;
receive, via the transceiver, in response to the transmitted UE capability information, first configuration signaling that configures a first DRX configuration for a first set of component carriers (CCs) in the first band; and
communicate, via the transceiver, over the first set of CCs in the first band and a second set of CCs in the second band via Carrier Aggregation (CA), wherein the communicating
over the first set of CCs in the first band includes communicating based on the first DRX configuration without causing an interruption in communication over the second set of CCs in the second band.

14. The UE of claim 13, wherein the one or more processors are further configured to cause the UE to switch on Radio Frequency (RF) circuitry of the transceiver that is associated with the first set of CCs in the first band for an Active Time of a DRX cycle for the first DRX configuration.

15. The UE of claim 13, wherein the one or more processors are further configured to cause the UE to switch off Radio Frequency (RF) circuitry of the transceiver that is associated with the first set of CCs in the first band for at least a portion of a DRX cycle for the first DRX configuration other than an Active Time of the DRX cycle.

16. The apparatus UE of claim 13, wherein the one or more processors are further configured to cause the UE to:

receive, via the transceiver, in response to the transmitted UE capability information, second configuration signaling that configures a second DRX configuration for the second set of CCs in the second band, wherein the communicating over the second set of CCs in the second band includes communicating based on the second DRX configuration without causing an interruption in communication over the first set of CCs in the first band.

17. The UE of claim 16, wherein both the first DRX configuration and the second DRX configuration employ a common DRX cycle.

18. The UE of claim 16, wherein the first DRX configuration comprises a first drx-onDuration Timer parameter having a first value, and wherein the second DRX configuration comprises a second drx-onDuration Timer parameter having a second value that is different from the first value.

19. The UE of claim 16, wherein the first DRX configuration comprises a first drx-Inactivity Timer parameter having a first value, and wherein the second DRX configuration comprises a second drx-Inactivity Timer parameter having a second value that is different from the first value.

20. The UE of claim 1, wherein:

the first frequency range comprises one of Frequency Range 1 (FR1) or Frequency Range 2 (FR2); and the second frequency range comprises the other of FR1 or FR2.

21. The UE of claim 8, wherein:

the first frequency range comprises one of Frequency Range 1 (FR1) or Frequency Range 2 (FR2); and the second frequency range comprises the other of FR1 or FR2.

\* \* \* \* \*